United States Patent
Logston et al.

(10) Patent No.: US 6,687,735 B1
(45) Date of Patent: Feb. 3, 2004

(54) METHOD AND APPARATUS FOR BALANCING DISTRIBUTED APPLICATIONS

(75) Inventors: Gary Logston, Poway, CA (US); Patrick Ladd, San Marcos, CA (US)

(73) Assignee: Tranceive Technologies, Inc., Carlsbad, CA (US)

( * ) Notice: Subject to any disclaimer, the term of this patent is extended or adjusted under 35 U.S.C. 154(b) by 518 days.

(21) Appl. No.: 09/583,064

(22) Filed: May 30, 2000

(51) Int. Cl.[7] .............................................. G06F 15/16

(52) U.S. Cl. ...................... 709/203; 709/217; 709/219; 709/220; 709/316; 709/328; 709/329; 370/486; 370/487

(58) Field of Search ................................ 709/203, 217, 709/219, 220, 316, 328, 329; 370/486, 487

(56) References Cited

U.S. PATENT DOCUMENTS

| | | | |
|---|---|---|---|
| 4,969,092 A | 11/1990 | Shorter | |
| 4,991,089 A | 2/1991 | Shorter | |
| 5,457,797 A | 10/1995 | Butterworth et al. | |
| 5,555,244 A | 9/1996 | Gupta et al. | |
| RE35,448 E | 2/1997 | Shorter | |
| 5,606,493 A | 2/1997 | Duscher et al. | |
| 5,664,093 A | 9/1997 | Barnett et al. | |
| 5,673,265 A | 9/1997 | Gupta et al. | |
| 5,740,176 A | 4/1998 | Gupta et al. | |
| 5,799,017 A | 8/1998 | Gupta et al. | |
| 5,818,448 A | 10/1998 | Katiyar | |
| 5,826,085 A | * 10/1998 | Bennett et al. | 709/227 |
| 5,864,542 A | 1/1999 | Gupta et al. | |
| 5,898,839 A | * 4/1999 | Berteau | 709/202 |
| 5,915,090 A | * 6/1999 | Joseph et al. | 709/203 |
| 5,920,868 A | 7/1999 | Fowlow et al. | |
| 5,924,094 A | 7/1999 | Sutter | |
| 5,958,009 A | 9/1999 | Friedrich et al. | |
| 5,958,012 A | 9/1999 | Battat et al. | |
| 5,966,531 A | 10/1999 | Skeen et al. | |
| 5,993,038 A | 11/1999 | Sitbon et al. | |
| 6,026,404 A | 2/2000 | Adunuthula et al. | |
| 6,028,846 A | 2/2000 | Cain | |
| 6,047,323 A | 4/2000 | Krause | |
| 6,055,537 A | 4/2000 | LeTourneau | |
| 6,058,106 A | 5/2000 | Cudak et al. | |
| 6,067,545 A | 5/2000 | Wolff | |
| 6,067,577 A | 5/2000 | Beard | |
| 6,073,163 A | * 6/2000 | Clark et al. | 709/229 |

(List continued on next page.)

Primary Examiner—Zarni Maung
Assistant Examiner—Jinsong Hu
(74) Attorney, Agent, or Firm—Gazdzinski & Associates

(57) ABSTRACT

An improved method and apparatus for balancing distributed applications within a client/server network, such as a cable television network, is disclosed. In one aspect of the invention, a method of balancing the load of distributed application client portions (DACPs) across various server portions (DASPs) and server machines is disclosed. Statistics are maintained by one or more software processes with respect to the available resources of the servers and their loading; new process threads and/or distributed application server portions are allocated across the servers to maintain optimal system performance as client device loading increases or changes. In another aspect of the invention, a novel object-oriented distributed application software architecture employing both vertical and horizontal partitions and "mutable" (i.e., transportable) objects is disclosed. The mutable objects may reside on either the server or client portions of the distributed application while maintaining at least one network partition. A runtime environment adapted for the operation of the foregoing object-oriented distributed application, including an efficient message protocol useful for interprocess communication, is also disclosed. Methods for downloading the DACP from the servers, and scaling the DACP at download based on client device configuration, are further disclosed.

3 Claims, 28 Drawing Sheets

U.S. PATENT DOCUMENTS

| | | |
|---|---|---|
| 6,073,184 A | 6/2000 | Couturier et al. |
| 6,085,246 A | 7/2000 | Brandt et al. |
| 6,088,796 A | 7/2000 | Cianfrocca et al. |
| 6,094,688 A | 7/2000 | Mellen-Garnett et al. |
| 6,101,508 A | 8/2000 | Wolff |
| 6,115,710 A | 9/2000 | White |
| 6,119,165 A * | 9/2000 | Li et al. .................. 709/247 |
| 6,125,400 A * | 9/2000 | Cohen et al. ................ 370/397 |
| 6,138,168 A | 10/2000 | Kelly et al. |
| 6,141,737 A | 10/2000 | Krantz et al. |
| 6,149,961 A | 11/2000 | Kepplinger et al. |
| 6,157,934 A | 12/2000 | Khan et al. |
| 6,222,843 B1 * | 4/2001 | Mauger ...................... 713/178 |
| 6,223,287 B1 * | 4/2001 | Douglas et al. ............. 713/178 |

\* cited by examiner

(PART 1 OF 5)

(PART 2 OF 5)

(PART 3 OF 5)

```
+LAST_BUF_LEN_IDX:byte
+NAK_REASON_IDX:byte
+BUFS_MASK:byte
+ACK_MASK:byte
+NAK_MASK:byte
+REPLY_MASK:byte
+VERSION:byte
```
```
+DA_Msg
+DA_Msg
+addData:void
+makePktHdr:void
+copyHdr:byte[ ]
+allBufsRecvd:boolean
+insertSentTime:void
+setbuffer:void
+getHdrLen:int
+parseCmdType:short
+parseSessionId:byte
+parseXactId:byte
+parseFlags:byte
+parseBufnum:byte
+parseReply:boolean
+parseAck:boolean
+parseNak:boolean
+parseMultiBufs:boolean
```
```
 cmdType:short
 sentTime:int
 databyte[ ]
 sessionId:byte
 xactId:byte
 flags:byte
```
516

FIG. 5
(PART 4 OF 5)

| Fault |
|---|
| +INVALID_SESSION_ID:short |
| +INVALID_XACT_ID:short |
| +INVALID_HDR:short |
| +RETRIES_EXCEEDED:short |
| +INVALID_MSG_LEN:short |
| +BUF_OUT_OF_ORDER:short |
| +CMD_NOT_FOUND:short |
| +SOCKET_SECURITY_BREECH:short |
| +SOCKET_IO_FAILURE:short |
| +GROUP_JOIN_FAILURE:short |
| +REPLY_WO_CMD:short |
| +REPLY_WO_LISTENER:short |
| +log:void |
| +log:void |
| +log:void |

| CmdTypes |
|---|
| +KILL_CMD_CMD:short |
| +OPEN_SESSION_CMD:short |
| +OPEN_SESSION_REPLY_CMD:short |
| +CLOSE_SESSION_CMD:short |
| +CLOSE_SESSION_REPLY_CMD:short |
| +RESERVED_CMD_MASK:short |
| +APP_CMD_MIN:int |
| +OPEN_SESSION_CMD_SIZE:int |
| +OPEN_SESSION_REPLY_SIZE:int |

| XactStates |
|---|
| +INIT_S:int |
| +CLIENT_ACK_WAIT_S:int |
| +CLIENT_DATA_WAIT_S:int |
| +DONE_S:int |
| +SERVER_MULTI_BUF_WAIT_S:int |
| +SERVER_APP_WAIT_S:int |

| tester |
|---|
| -main:void |

FIG. 5
(PART 5 OF 5)

(PART 1 OF 2)

(PART 2 OF 2)

METHOD AND APPARATUS FOR BALANCING DISTRIBUTED APPLICATIONS

BACKGROUND OF THE INVENTION

1. Field of the Invention

The present invention relates generally to the field of software applications that are distributed over an information network, and specifically to the dynamic distribution and division of software applications and other associated components between the client device(s) and server(s) on the network.

2. Description of Related Technology

Client-server network architectures are well known in the data networking arts. Often, there is a need to divide the software associated with such client-server systems into multiple components which are distributed across one or more devices of the network. A Distributed Application (DA) is a computer program that is broken into such multiple components. These components are then distributed as client and server portions of the distributed application; hereinafter known as the Distributed Application Client Portion (DACP) and the Distributed Application Server Portion (DASP).

Typically, client devices, hereinafter known as "the client", will have no where near the processing power of a server machine ("the server"). Examples of client devices include set-top boxes and networked personal computers (PCs). The DACP will be considered "thin" meaning that it will generally have minimal functionality so as to minimize the resource burden placed on the client device. Therefore, most of the distributed application will run on the server, the configuration of which is selected so as to be capable of handling the needs of multiple DACPs simultaneously. Hence, a single DASP can handle processing for multiple DACPs for the same application. In addition, a single server can run as many DASPs as its hardware and operating system constraints will allow. A server may run multiple DASPs for the same or different applications simultaneously.

In general, the server downloads the DACP to the client device(s) upon the occurrence of a specified event, such as the user selecting a function on their set-top box. The author of the distributed application software determines how processing is divided between the DASP and the DACP. The DACP is, for example, often limited to handling only input/output (I/O) and graphics functionality on the client device. The DACP places consumer input data into messages and sends them to the distributed application server for processing. FIG. 1 demonstrates the foregoing distributed application model for a single client to server relationship.

With the advent of digital cable systems that provide downloadable software applications and reverse communications with entities such as multi-system operator (MSO) head-ends and the Internet, set-top box and client device resource requirements have risen dramatically. Downloadable software applications taking full advantage of resources defined in standards such as the OpenCable Standard, ATSC (Advanced Television Systems Committee), DASE (Digital television Applications Software Environment) and DVB (Digital Video Broadcasting) can demand considerable CPU, memory, and storage resources, which leads to greater set-top box complexity and cost.

In order to allow for the operation of such resource-intensive software applications while using only the minimum profile set-top equipment, a technique is needed to dynamically off-load portions of the application execution to server processes not residing in the client device. Existing prior art distributed applications do not permit such dynamic allocation or "scaling" between the server and client portions, especially based on upon the client device configuration, thereby requiring careful consideration of the client device configuration during development of the distributed application. For example, the well-known prior art CORBA (Common Object Request Broker Architecture) environment is a non-scaling three tiered system. The three tiers of the CORBA system consist of a user interface (UI) tier, computational processing tier, and database tier. The client device employs a graphical user interface (GUI) as the UI tier. One or more servers containing the processing tier and the database tier are also employed in this system. This three tier approach does not, however, provide any facility for scaling of the distributed application between the server(s) and client device(s), whether based on client device configuration or otherwise. Specifically, such three tier systems do not define moving objects around dynamically at runtime, in order to make a client "thinner" or "fatter" based on the resource capability of the client.

Similarly, the well known COM+ and DCOM systems produced by Microsoft Corporation provide templates or frameworks for the server and client pieces, yet these frameworks are not automatically self-distributing and do not provide for distributed application scaling or dynamic movement of objects based on resource capability at runtime.

In addition to distributed application scaling and distribution described above, a technique is needed whereby server portions of such applications can be dynamically distributed among all of the available servers at the head-end, thereby obviating constant manual configuration by the MSO, and permitting the head-end application management to be self-governing. Prior art distributed application systems typically accomplish server-end load balancing by measuring communications bandwidth or similar parameters representative of the loading on a given server, and re-allocating the load accordingly. Hence, these prior art systems conduct load balancing at the lower layers (e.g., physical or transport layers of the OSI model) of the protocol stack. This generic network approach works well for PC network topologies, yet is not well suited to a cable (e.g., HFC) network which requires a finer grained approach.

SUMMARY OF THE INVENTION

The present invention satisfies the aforementioned needs by providing an improved method and apparatus for balancing and dynamically distributing the various components of a distributed application within a client-server environment.

In a first aspect of the invention, an improved method of starting and downloading the client portion of a distributed application on a client-server network is disclosed. The method generally comprises the steps of providing a distributed application having a plurality of separable modules; disposing the distributed application on a server within the network; transferring a first portion of the plurality of modules to a client device via a first communication channel; attempting to establish a second "reverse" communication channel between the client device and the server; detecting when the reverse channel is not established, and subsequently transferring additional modules of the distributed application to the client device from said server in a predetermined increment until the second communication channel can be successfully established. In one exemplary embodiment, a number of different secondary communication channel options including a cable modem (DOCSIS), out-of-band (OOB), and telephone company (telco) modem, are used hierarchically such that if the first selected channel in the hierarchy can not be established, the second is next tried, and so forth. Downloading of the communications modules associated with these channels is also performed hierarchically so that only the minimum portion of the distributed application necessary to facilitate communication via the reverse channel is downloaded to the client device.

In a second aspect of the invention, an improved server/head-end MSO architecture adapted for distributed application load balancing is disclosed. The improved head-end architecture generally comprises a plurality of servers arranged in a server farm; a distributed application comprising at least one server portion disposed on at least one of the servers in the farm; a runtime entity comprising a plurality of software processes which facilitate the allocation of client device load between the various servers in the farm; and a message protocol adapted for communication between the software processes of the runtime entity and between the processes and the server portion. In one exemplary embodiment, the runtime entity includes a statistics process and a timing process, the statistics and timing processes cooperating to allocate client device load among the servers in the server farm based on server loading and/or the latency of processing requests received by individual servers from one or more client devices.

In a third aspect of the invention, an improved message protocol used for communication between various system entities associated with a distributed application used on a client-server network is disclosed. The protocol generally comprises an address object having a first address associated therewith, the first address comprising a local address of one or more of the entities of the distributed application which are disposed on the same server. A second address comprising a network address one or more other entities of the distributed application disposed on other servers is also optionally included. In one exemplary embodiment, the aforementioned addresses comprise virtual addresses (VAs), and a proximity detection object (PDO) is employed within the runtime environment in order to determine the physical proximity of the various entities between which the message protocol will be used to communicate.

In a fourth aspect of the invention, an improved method of communicating between portions of a distributed application within a client-server network having a plurality of servers and a plurality of client devices is disclosed. The method generally comprises providing a distributed application having a server portion and a client portion disposed on a first server and first client device, respectively; assigning a virtual address to the server and client portions, the at least one virtual address uniquely identifying the location of its respective server or client portion anywhere within the network; moving the server portion and/or client portion to a second server and/or client device within the network, respectively; and maintaining communication between the client and server portions using the virtual address.

In a fifth aspect of the invention, a method of configuring a client-server network having a distributed application, server resources, and a plurality of client devices is disclosed. The method generally comprises providing a process running within the server resources and configured to obtain data relating to the usage of the server resources; receiving, at said server resources, a server resource request from a client device; selecting a server within the server resources based at least in part on the data from the process; starting the server portion of said distributed application on said selected server; and downloading the client portion of the distributed application to the client device from the selected server. After download, the client portion is started at the client device, and a message sent to said server portion indicating that the client device has been started.

In a sixth aspect of the invention, an improved distributed application for use in a cable network is disclosed. The distributed application generally comprises a server portion having a plurality of modules disposed on at least one of a plurality of servers of the cable network; a client portion disposed on at least one of a plurality of client devices associated with the network; and at least one mutable module, the mutable module being adapted to run on either a server or client device while maintaining at least one network partition. In one exemplary embodiment, the distributed application comprises a plurality of different types of modules including one or more of the following: (i) anchor point modules; (ii) mutable modules; (iii) add-on modules; (iv) system process modules; and (v) peer locked modules. Anchor point modules are those module whose location within the distributed application architecture is fixed at runtime, and which are required to implement the distributed application server and/or OpenCable client frameworks. Mutable objects contain client/server partitions and can move from server to client. These modules are scalable, and may be used as a substitute for network partitions on the client side of the distributed application. Add-on modules are used to facilitate additional capabilities within a client device (or server) under certain operational conditions. System process modules are operating system processes that provide support to user applications. Peer-locked modules are application specific modules that are restrained from movement between the server and client due to the existence of peer interfaces with other processes.

In an seventh aspect of the invention, an improved method of allocating server resources based on latency is disclosed. In general, the method comprises providing a message format including the time of transmission information; determining system latency based at least in part on the time of transmission information; providing said system latency to a server process; and allocating server resources based on the latency. In one exemplary embodiment, the message format comprises the message protocol (MP) referenced above, which is used for inter-process communications between the client and server portions of a distributed application. A "sent-time" parameter is included within the MP indicating the time of transmission of the processing request by the client portion. This sent-time parameter is compared to the head-end system clock at time of processing by the server portion to determine server latency.

In an eighth aspect of the invention, a method of optimizing the performance of a cable network having a servers and a client device is disclosed. In one embodiment, the method comprises providing a distributed application having a server portion and a client portion disposed on the server and client device, respectively the server portion having at least one processing thread running thereon; receiving a plurality of processing requests from one or more client portions at the server portion; measuring the value of at least one parameter associated with the access of the server portion by the processing requests; generating, based at least in part on the measured value, a new process thread within the same server portion; and processing at least one of the plurality of requests using the new process thread. In a second embodiment, the method further comprises spawning and distributing, based at least in part on the measured value, one or more process threads to other servers within the network, and processing, at the other server, at least one of the plurality of processing requests using the new process thread(s).

In a ninth aspect of the invention, an improved method for spawning a distributed application within a client/server network having a server farm and a plurality of client devices is disclosed. In one embodiment, the method comprises: selecting a transport stream DACP (TSDACP); executing the TSDACP at the client device; requesting a DASP for the TSDACP from the server farm; selecting an appropriate server on which to spawn the DASP; spawning the DASP on the selected server; informing the TSDACP that the DASP is available; and running the distributed application based on input from the user.

DETAILED DESCRIPTION OF THE INVENTION

Figure 1:
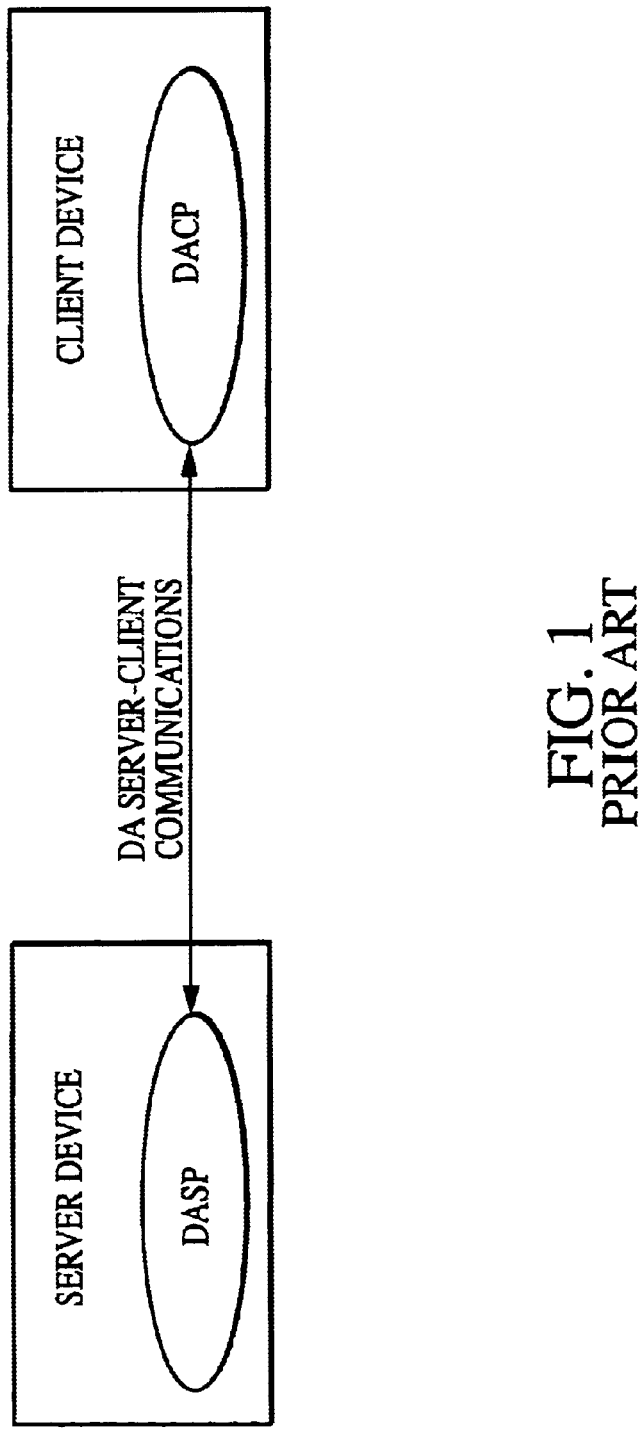
FIG. 1 is block diagram illustrating a typical prior art client-server relationship on an information network.

Reference is now made to the drawings wherein like numerals refer to like parts throughout.

Distributed Application Software Terminology

As used herein, the term "application" refers generally to a unit of executable software that implements theme-based functionality. The themes of applications vary broadly across any number of disciplines and functions (such as e-commerce transactions, brokerage transactions, mortgage interest calculation, etc.), and one application may have more than one theme. The unit of executable software generally runs in a predetermined environment; for example, the unit could comprise a downloadable Java Xlet™ that runs within the JavaTV™ environment.

The term "component" refers generally to a unit or portion of executable software that is based on a closely related set of functionalities. For example, a component could be a single class in Java™ or C++. Similarly, the term "module" refers generally to a loosely coupled yet functionally related set of components.

As used herein, the term "process" refers to executable software that runs within its own CPU environment. This means that the process is scheduled to run based on a time schedule or system event. It will have its own Process Control Block (PCB) that describes it. The PCB will include items such as the call stack location, code location, scheduling priority, etc. The terms "task" and "process" are typically interchangeable with regard to computer programs.

Similarly, a "task" as used herein generally refers to a process-like entity whose PCB is referred to as a Task Control Block (TCB). A "thread" refers to a process having the same properties as a task except that it runs within a task context and uses the task's TCB. Multiple threads can run within the context of a single task. Threads are more efficient than tasks because they don't take as much time to be switched into CPU context when the task they are associated with is already running.

In general, the term "function" is used herein to indicate a callable set of source code that has singular functionality, a unique name, a return type, and a parameter list of types that are passed to the function when it is called. The term function is typically used when describing non-object oriented computer languages such as 'C' and Pascal; object oriented languages typically use the terms "operation" or "method." The primary difference between the object oriented "operation" or "method" and a "function" is that operations and methods are contained within an object, while a function is generally not so restricted. This distinction is of significance to the scope of the function, i.e. where the function is visible; however, in all other respects, an object/method and function are identical. Hence, unless specifically indicated otherwise, the terms function, method, and operation are used interchangeable within this disclosure.

As used herein, the term "queue" refers generally to an entity for interprocess communications. One process may wait indefinitely for an incoming message. Each process can have its own message queue. Each process can post messages to any other process that creates its own queue.

The term "client process" refers to an executable software process that requests information and/or resources from another computer process (the server). The process typically will have its own Process Control Block (PCB) that describes it. The PCB will include items such as the call stack location, code location, scheduling priority, etc.

Lastly, a server process is an executable software process that serves various resources and information to other processes (clients) that request them. The server may send resources to a client unsolicited if the client has previously registered for them, or as the distributed application author dictates. Note also that the server process may or may not be on the same computer as the client.

It will also be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

Overview

The invention disclosed herein comprises, inter alia, a method and apparatus for automatically and dynamically distributing the load of the server portion of distributed applications among multiple threads on a designated server machine, and/or among multiple server machines. A distributed application (DA), within the context of this disclosure, is defined as a computer program that is broken into multiple components. The components of the distributed application are distributed as client and server portions; hereinafter known as the distributed application client portion (DACP) and the distributed application server portion (DASP).

As previously described, the client portions of the server/client distributed application are configured so that they have minimal functionality in order to minimize the resource burden placed on the client device. Typically, client devices, hereinafter known as "the client", have no where near the processing power of a server machine ("the server"). Examples of clients include, inter alia, set-top boxes, cable modems, network PCs, and terminal devices such as digital cable-ready television sets. Therefore, most of the distributed application runs on the server, which is powerful enough to handle the needs of multiple DACPs. That is, a single DASP can handle processing for multiple DACPs for the same application. In addition, a single server can run as many DASPs as its hardware and operating system constraints will allow. A server may run multiple DASPs for the same or different applications simultaneously.

In distributed application architectures, the server typically downloads the DACP of a given distributed application to the client device(s). The author of the distributed application determines how the DASP and DACP processing are divided. The DACP is often limited to I/O and graphics handling on the client device. The distributed application client also may place consumer input data into messages and send these messages back to the distributed application server for processing.

Figure 2:
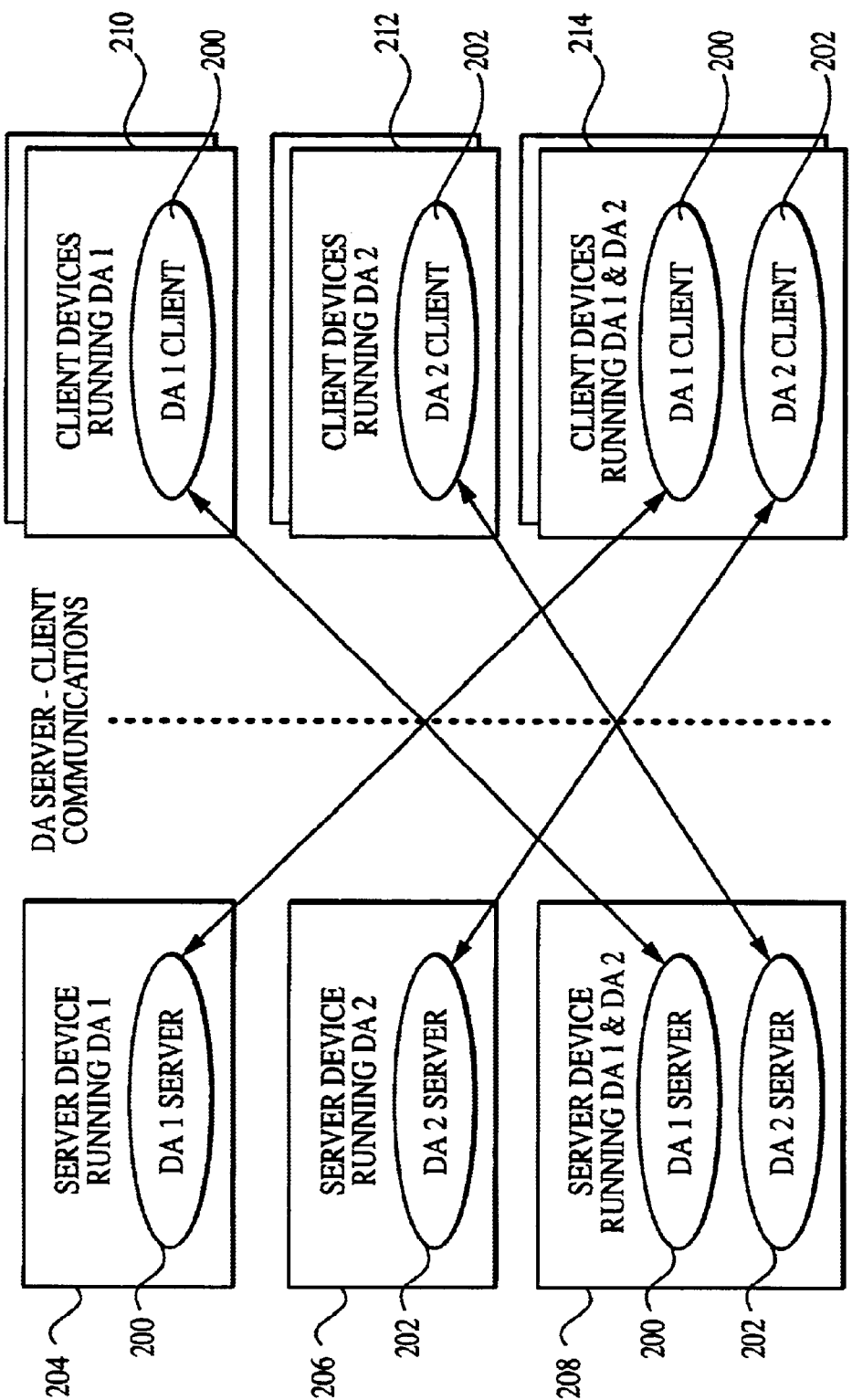
FIG. 2 is a logical block diagram illustrating a typical generic run-time scenario comprising two distributed applications running on multiple clients and servers.

FIG. 2 illustrates a typical generic run-time scenario comprising two distributed applications (DAs) running on multiple clients and servers. The distributed applications are identified as "DA 1"200 and "DA 2"202 for simplicity. DA 1 and DA 2 are distributed as shown based on the current load of the three available servers 204, 206, 208 by the client devices 210, 212, 214. The servers 204, 206, 208 collectively comprise a server "farm," although it will be appreciated that other numbers and relationships between the servers in the farm may be employed. Note that the distributed applications DA1 and DA2 may be of the same or different theme. For example, DA 1 might be an e-commerce application and DA 2 might be an Interactive Program Guide (IPG), or alternatively DA1 and DA2 could both be e-commerce applications. It will be appreciated that any number of different combinations of applications may be run in such an environment.

The present invention utilizes a specially structured distributed application operating within a "runtime" environment to effectuate load balancing. One fundamental aspect of the invention is a methodology for automatically distributing the load of the server portion of distributed applications among multiple threads on the current server machine or multiple server machines, such as the various servers 204, 206, 208 and client devices 210, 212, 214 of FIG. 2. In order to facilitate this automatic load balancing, the invention utilizes (i) a distributed application structure which comprises a number of different types of modules or objects as well as both vertical and horizontal partitions; (ii) two types of timers (i.e., a read timer and a write timer); and (iii) several types of system statistics. As described in greater detail below, the use of an object-oriented distributed application structure with vertical and horizontal partitions provides the maximum degree of flexibility in allocating portions of the distributed application between the server and client, as well as allocating or balancing load across multiple threads of a single server (or alternatively across multiple servers in a server farm). System statistics for CPU load, available memory, and other system parameters are used in conjunction with the timers to assure optimum server load balancing of system DASPs. Information is transferred between various components within the runtime environment according to one or more specially adapted message protocols. Included within these message protocols is information relating to the time at which a given message is transmitted ("sent-time"). This information is useful for event coordination such as in video streaming environments.

Object-Oriented Distributed Application Structure

Referring now to FIGS. 3 through 6, the aforementioned distributed application structure and interactive development environment of the present invention is described in detail.

Figure 3:
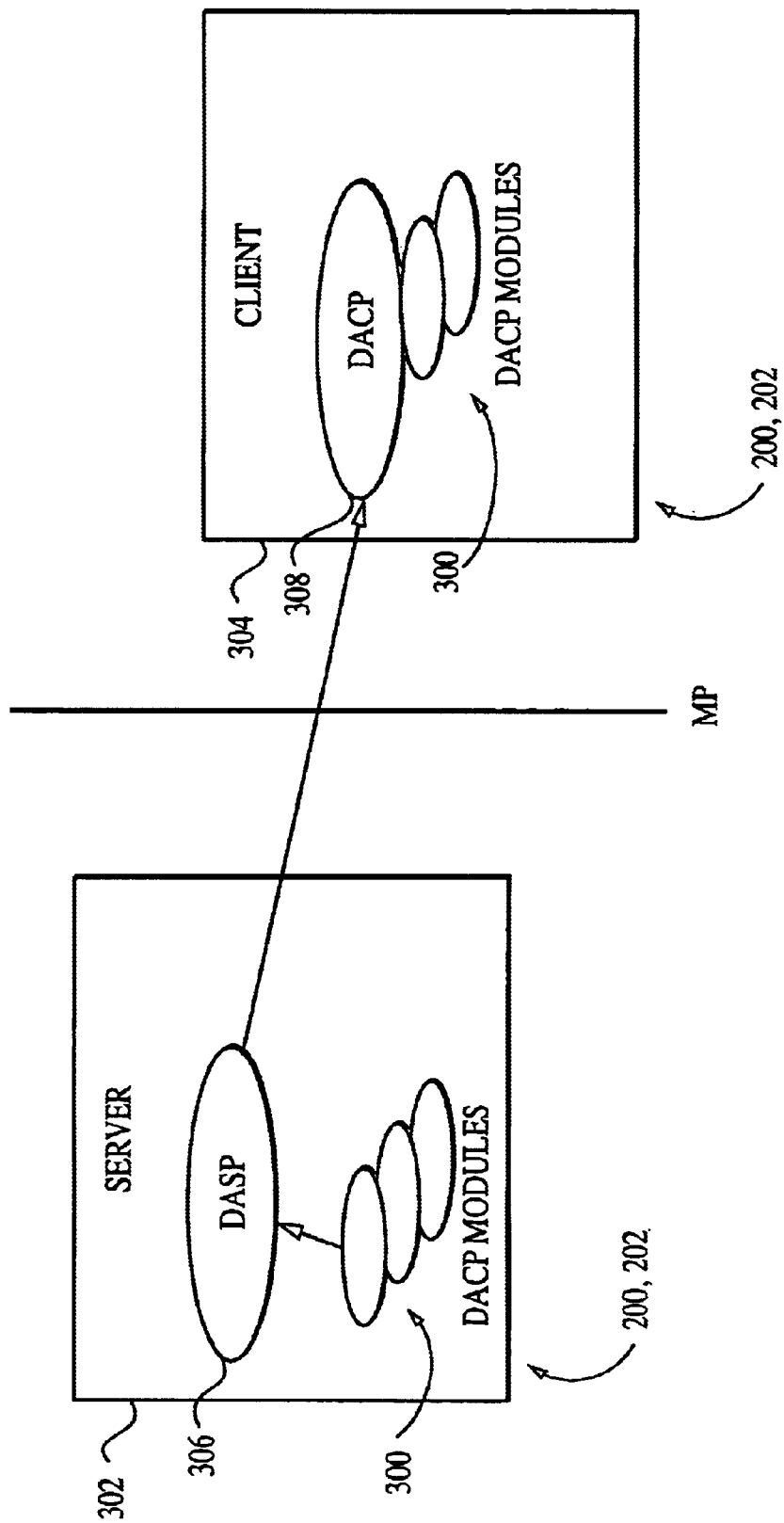
FIG. 3 is a logical block diagram illustrating the relationship of the DASP and DACP (including DACP modules) during DACP download form server to client device.

As illustrated in FIG. 3, the distributed application 200, 202 of FIG. 2 comprises a series of modules 300 that can run on either the server 302 or the client device 304. In one exemplary embodiment, these modules are defined in terms of an object-oriented language such as Unified Modeling Language (UML). UML is well known in the computer programming and software arts, and accordingly will not be described further herein. Among other benefits, the use of an object-oriented language such as UML allows the application authoring editor of the invention (described in greater detail below) to be language-independent at the design level.

In general, each distributed application of the present invention consists of at least one DASP module or framework 306 and one DACP framework 308. Each DASP framework is designed for distributed application balancing and responsiveness to the infrastructure, as described in greater detail below. Generally, responsiveness refers to the ability for various entities within the distributed application to dynamically respond to information requests and commands from other entities, instead of just application-specific commands. For example, system processes can shut down either the server portion or the client portion of the distributed application. Similarly, the server portion can shut down the client portion. System processes can also request statistics from the server and client portions, and reallocate client portions based on these statistics and/or server latency.

Given this degree of sophistication, a DASP framework 306 cannot run on a client device 304. Each DACP framework in the exemplary embodiment described below is designed for minimal resource usage and OpenCable set-top application compliance. Therefore, a DACP framework so designed can only run on an OpenCable compliant set-top box or terminal device. There may be multiple DASP frameworks in a distributed application that will be able to communicate with each other. Likewise, there may be multiple DACP frameworks.

Two types of partitions or interfaces are defined in each DASP or DACP framework, namely peer partitions and client/server partitions. A peer partition is one that uses a third party proprietary protocol. It can not migrate from server to client and can only run on one component or the other, dependent upon where it is started. A peer partition can be thought as a horizontal protocol. On the contrary, a module containing a vertical or client/server partition may migrate from server to client, since the required interface across the partition is preserved regardless of the location of the module.

In general, the objects or modules within any distributed application used in accordance with the invention can be classified as falling into one of the following five categories based on their functionality and restrictions in movement within the network: (i) "anchor points"; (ii) mutable objects; (iii) add-on modules; (iv) system processes; or (v) peer locked modules. Each of these types of modules is described in greater detail below. It will be noted that while the objects or modules within the distributed application generally fall into one of the five categories, other types of objects with other properties may conceivably be used consistent with the invention. Furthermore, not all of the five types of objects or modules described herein need be present in any single distributed application; rather, the composition of the distributed application is determined by the required functionality.

As the name implies, an anchor point is a module whose location within the distributed application architecture is fixed at runtime. Anchor point modules are required to implement the distributed application server and/or Open-Cable client frameworks. Such modules include for example the server portions of the distributed applications (DASP), and the OpenCable client (DACP) portions. These modules generally maintain a static location so that other objects and processes within the application may communicate therewith. The DACP can be thought of as "fixed"; moving the client portion is effectively the same as simply restarting it on a different client device. The DASP may move; however, such movement is an undesirable situation because any current transactions between the existing server portion and the client portion must be resolved. Additionally, considerable time and resources are needed to shutdown the server, temporarily hold-off communication with the associated client portion(s), restart the DASP somewhere else, and force the client through another "open-session" transaction. Hence, this procedure is typically reserved for times when the existing server portion has been significantly overloaded.

Mutable objects may only contain client/server partitions and can move from server to client. These modules are scalable, and may be used as a substitute for network partitions on the client side of the distributed application. Specifically, when a mutable object is moved to a client, the mutable object may be substituted for a network partition running as a separate thread. The extra thread then disappears, and the mutable object runs in the thread and memory space of the containing object. The containing object can be either another mutable object or a client portion anchor point. Advantageously, when used in such as substitute capacity, the overhead associated with the extra (e.g., the time required for the thread switch, memory for the TCB including stack space, etc.) is removed.

Add-on modules are modules which are used to facilitate additional capabilities within a client device (or server) under certain operational conditions. Such add-on modules are typically hardware specific in nature, although non-hardware specific modules may be employed within the architecture if desired. As an example, an add-on module may comprise a DOCSIS communications module which is downloaded to a client device from the server portion at or before runtime in order to facilitate cable-modem communications between the client device and the server.

System processes typically refer to operating system processes that provide support to user applications. In the context of the present disclosure, system processes are the processes that support the DASPs and DACPs. They can also be thought of as infrastructure processes. The type of support provided by system or infrastructure processes includes statistics gathering and performance monitoring, DASP spawning based on statistics, DACP injection into broadcast carousels, configuration of the client GUI, etc. Examples of these processes within the present invention include the load balancing, statistical, configuration, and database processes.

Lastly, peer-locked modules are application specific modules that are restrained from movement between the server and client due to the existence of peer interfaces with other processes, such as an API with a head-end database. In this regard, peer-locked modules are "non-mutable" in contrast to the mutable modules discussed above, in that the former may not migrate from server to client or vice-versa, while the latter may. Peer locked modules are not the same as the anchor points previously described, however, since the peer locked modules are not required within the server or Open-Cable frameworks of the system architecture. It will be recognized, however that anchor points can be peer-locked if they contain a peer partition.

Figure 4:
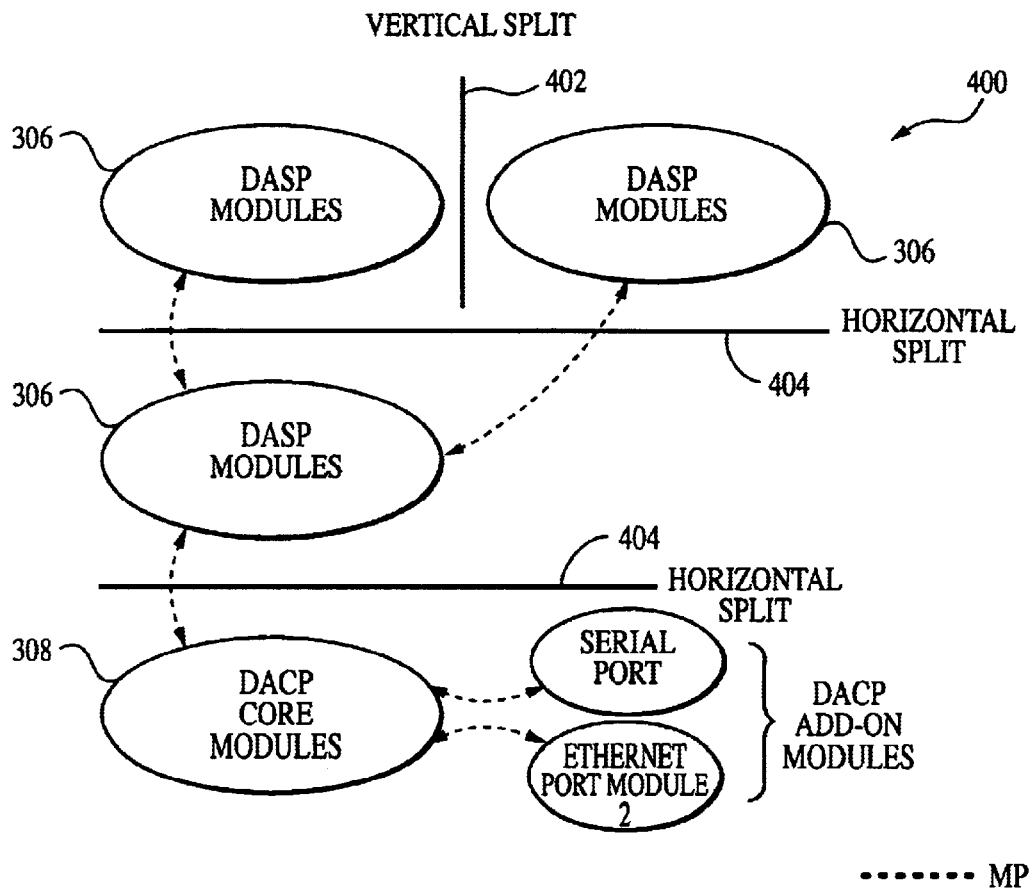
FIG. 4 is a logical block diagram illustrating the relationship between DASP and DACP modules with relation to vertical and horizontal partitions within the distributed application.

In order to facilitate the creation of distributed applications for the distributed application balancing system described herein, the interactive development environment (IDE) of the present invention incorporates an application authoring editor that provides application authors with the ability to specify how their applications are distributed. As described above, the authoring editor in one embodiment comprises an object-oriented UML-based editor which is advantageously language-independent at the design level. Using the authoring editor, an application can be split using a plurality of tiers. However, in contrast to the prior art "tier" approaches such as CORBA or DCOM previously described herein, the distributed application balancing system editor of the present invention is configured to allow application authors to create as many tiers as desired, thereby allowing the author additional flexibility. In addition, the authoring editor of the present invention further permits so-called "vertical" splitting of the application as well as "horizontal" splitting as in the tier system, as illustrated in FIG. 4. The ability to split the application 400 both vertically 402 and horizontally 404 (e.g., between peers at the client portions 308 or server portions 306, and between the client and server portions, respectively) allows for the authoring of computationally intensive applications that readily lend themselves to parallel processing in multiple CPU systems. Specifically, applications that lend themselves to parallel processing on separate physical CPUs can be described using a horizontal split. While the UML class diagrams presented herein show only a single server portion, the object diagrams will show an instantiation of the parallel object for each CPU for which it is to be created. Moreover, the UML diagrams show all communications and interactions between the parallel objects, application objects, and application external objects.

The authoring editor of the invention further provides framework templates for the five component types. Among other things, these templates enable the use of "thread safe," one-to-many relationships between the DASP 306 and the DACP(s) 308. As is known in the art, "thread safe" source code allows multiple threads to concurrently access the same resource (e.g., memory, object, etc.), without corruption of that resource.

A program module ("framework generator") is provided with the authoring editor of the present invention to convert the UML diagrams and any author provided high-level-language source code, to a targeted lower-level source code. The framework generator generally comprises, inter alia, conventional framework generation capability (i.e., taking a high-level input diagram such as a flow chart and generating source code in a designated programming language which implements the diagrammed functionality, such as C++, Java, etc.) along with the added ability to "layer" multiple framework generators in an interactive fashion such that translation between multiple environments is achieved. Furthermore, the framework generator may be used to generate frameworks compatible with other framework generation entities such as COM and COM+, Java Beans, Jini, and even CORBA IDL.

In the illustrated embodiment, each distributed application balancing system framework can be specified with one or more critical sections. As used herein, the term "critical sections" refers to a section of source code that accesses resource(s) in a exclusive fashion. Each critical section in a DASP is protected from multiple DACP entry using a "test-and-wait" function (such as a semaphore in the illustrated embodiment) that will wait for the desired resource. As is well known in the art, a semaphore is a mechanism that is used to signal the availability of a resource. One or more processes may wait indefinitely for a resource semaphore to signal availability. The semaphore function of the present embodiment is also optionally configurable such that, if a resource is capable of handling access from multiple processes simultaneously, a then the semaphore increments or "counts up" to the maximum number of processes before blocking access to the resource.

Alternatively, a queue may be used to implement the aforementioned test and wait functionality. The term "queue" refers generally to an entity for interprocess communications and allows messages to be passed between distributed application portions on the same system. A given process can therefore post messages to any other process that creates its own queue. Many variations of interprocess queues are well known to those of ordinary skill in the art, and accordingly will not be described further herein.

Furthermore, it will be appreciated that other "test-and-wait" functions, and in fact other types of protection mechanism for the critical sections, may be substituted for the semaphore and queue approaches previously described herein with equal success.

Figure 5:
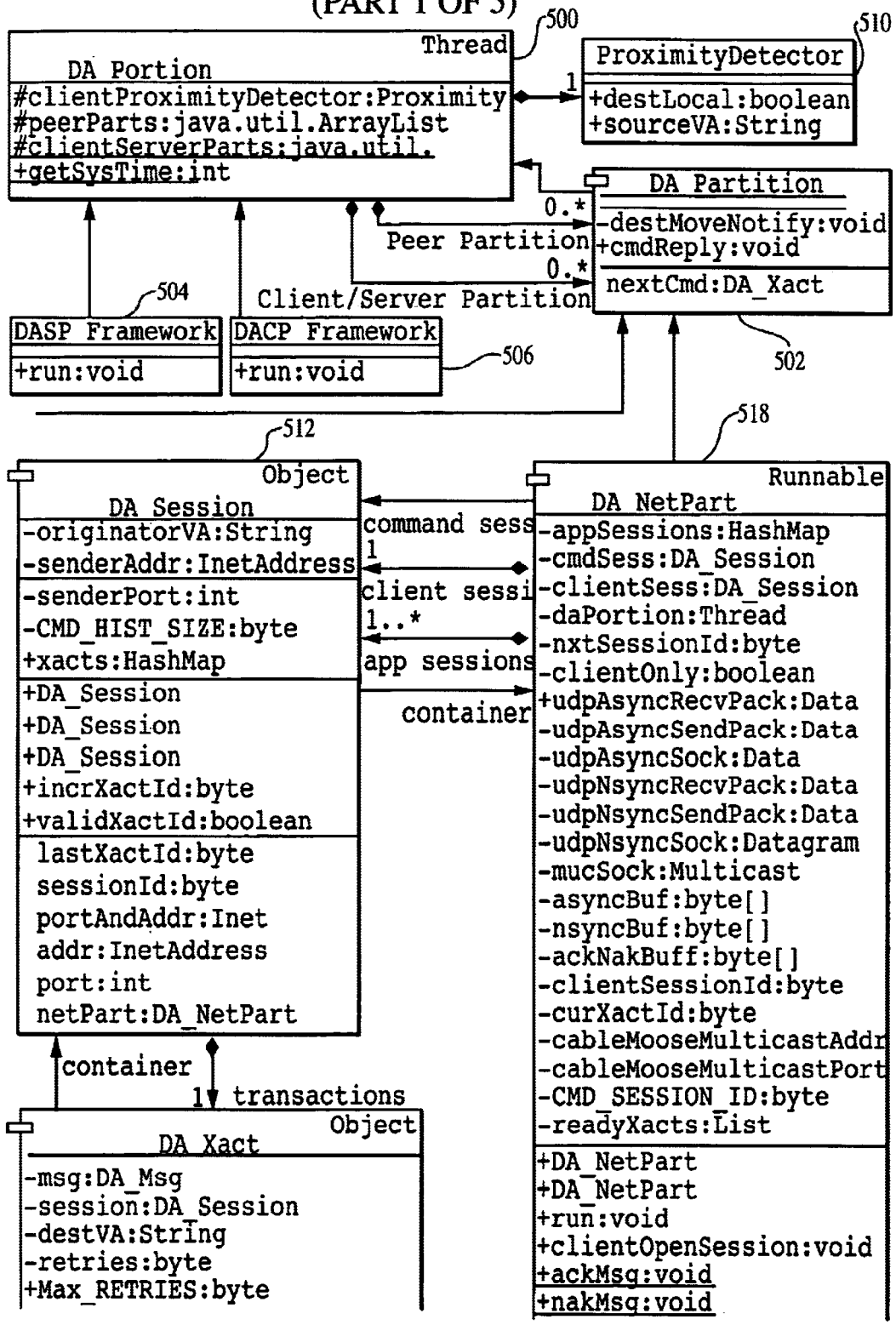
FIG. 5 is a unified modeling language (UML) class diagram illustrating the various objects of one exemplary embodiment of the distributed application of the present invention.
Figure 5:
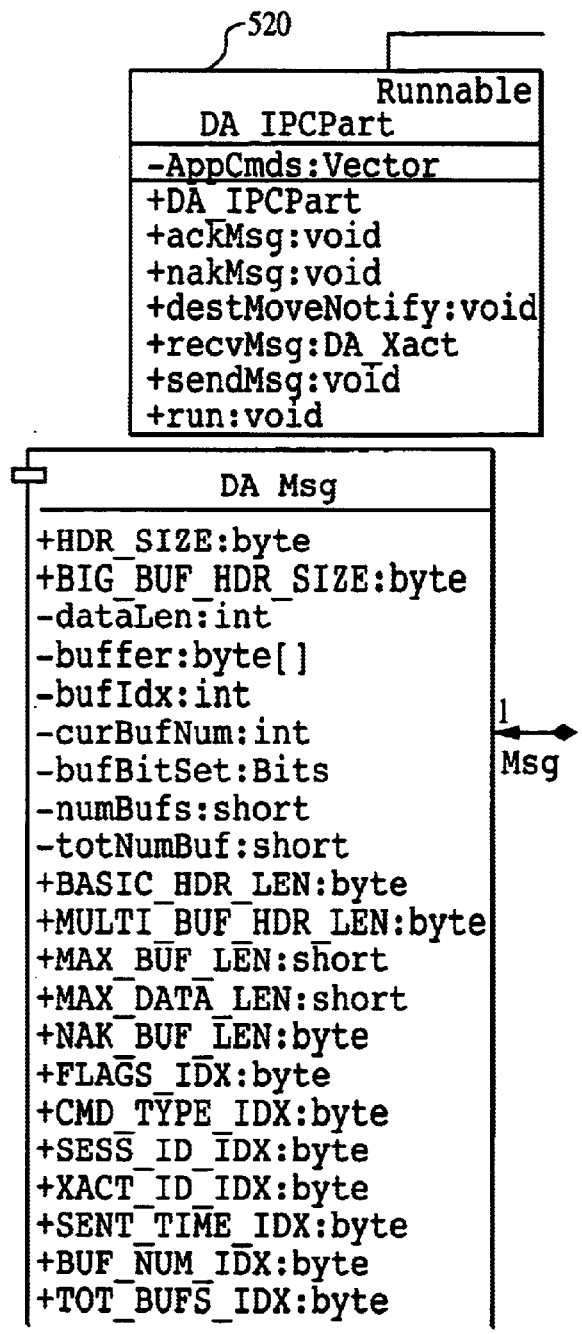
Figure 5:
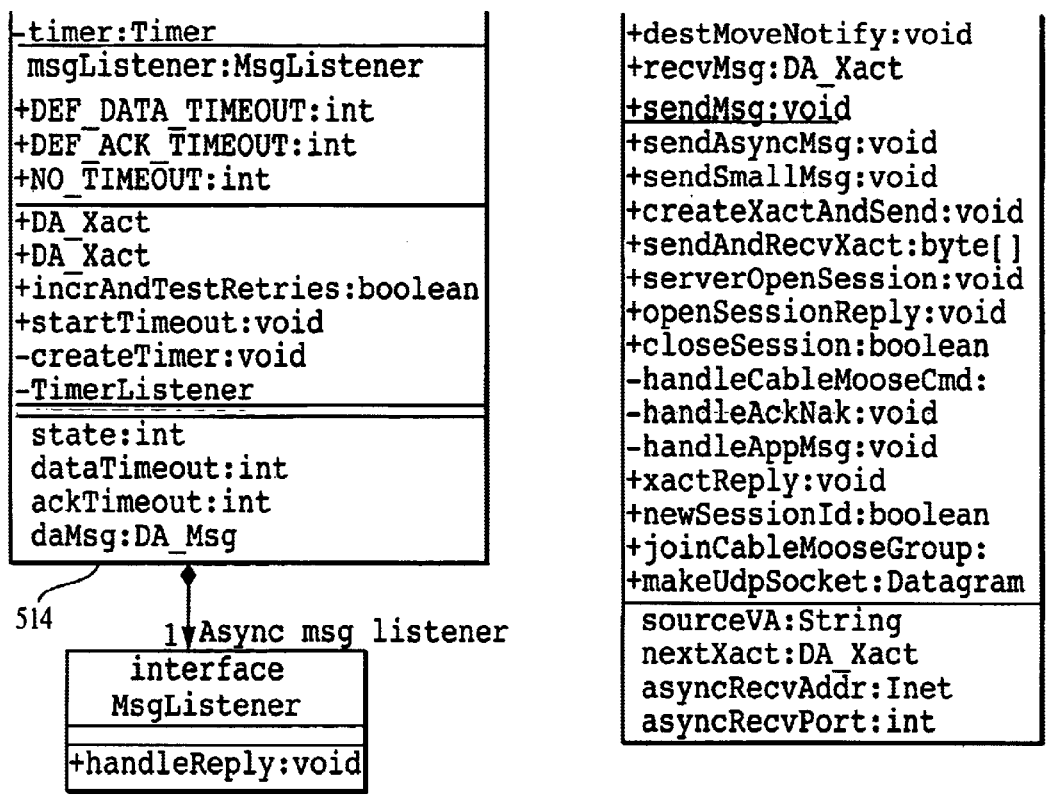

The authoring editor of the present invention further employs a graphical user interface (GUI) that is used to create distributed applications by defining them using UML or another object-oriented language. The GUI includes facilities for creating graphical representations of diagrams, such as for example those specified in the OMG Unified Modeling Language Specification version 1.3, dated Jun. 1999, which is incorporated herein by reference in its entirety. It will be recognized, however, that the authoring editor/GUI of the present invention may be adapted for use with any such graphical representations with equal success. In particular, the "use case", "class", "sequence", "activity", "state", and "collaboration" diagrams specified in the UML Manual can be used by the present embodiment to describe the distributed application architecture, including the DASP critical section frameworks and descriptions of how each of the clients interact with those frameworks. FIG. 5 illustrates an exemplary analysis phase UML class diagram for a distributed application according to the present invention. As illustrated in FIG. 5, the UML class diagram comprises inheritance hierarchies, as well as containment and other class associations. As shown in FIG. 5, DA_Partition classes 502 inherit from DA_Portion classes 500. In addition, distributed DA_Portion classes 500 contain peer and client/server data structures that can hold multiple DA_Partitions. This feature allows a mutable object that derives from a DA_Portion to substitute for any DA_Partition. The DASP and DACP frameworks 504, 506 inherit from the DA_Portion 500 as well. Each DA_Portion optionally contains a Proximity Detector Object (PDO) 510 that allows it to determine the physical proximity of any other object in the system, given its virtual address which is discussed in greater detail below. The DA_Session 512, DA_Xact (transaction) 514, and DA_Msg 516 classes are all used for client/server communications between objects on the same or different machines. These communications are transparent to the application objects and are described in greater detail herein with respect to the message protocol. The DA_NetPart (network partition) class 518 is specific to object communications on separate machines. The DA_IPCPart (inter-process communications partition) 520 is specific to objects communicating on the same machine, but not belonging to the same task context or group. In this case a "named pipe" is used. A named pipe is a communications mechanism well known to those of ordinary skill in the programming arts, and accordingly will not be discussed further herein. It should be appreciated that a named pipe is typically provided by the operating system, however, performance considerations (such as time or memory overhead imposed by the operating system implementation) may warrant implementing the named pipe in a particular configuration. It will also be appreciated that the fastest object communication method is typically direct DA_Partition to DA_Partition, where a mutable object substitutes for a network or IPC partition. This configuration places both partitions in the same task context and allows them to use shared memory.

Appendix I hereto contains the Java documentation for the code generated from the exemplary class diagram of FIG. 5. It will be recognized that other such class diagrams or representations, whether associated with UML or another object-oriented language, may be used in conjunction with the present invention to specify the distributed application architecture.

Figure 6:
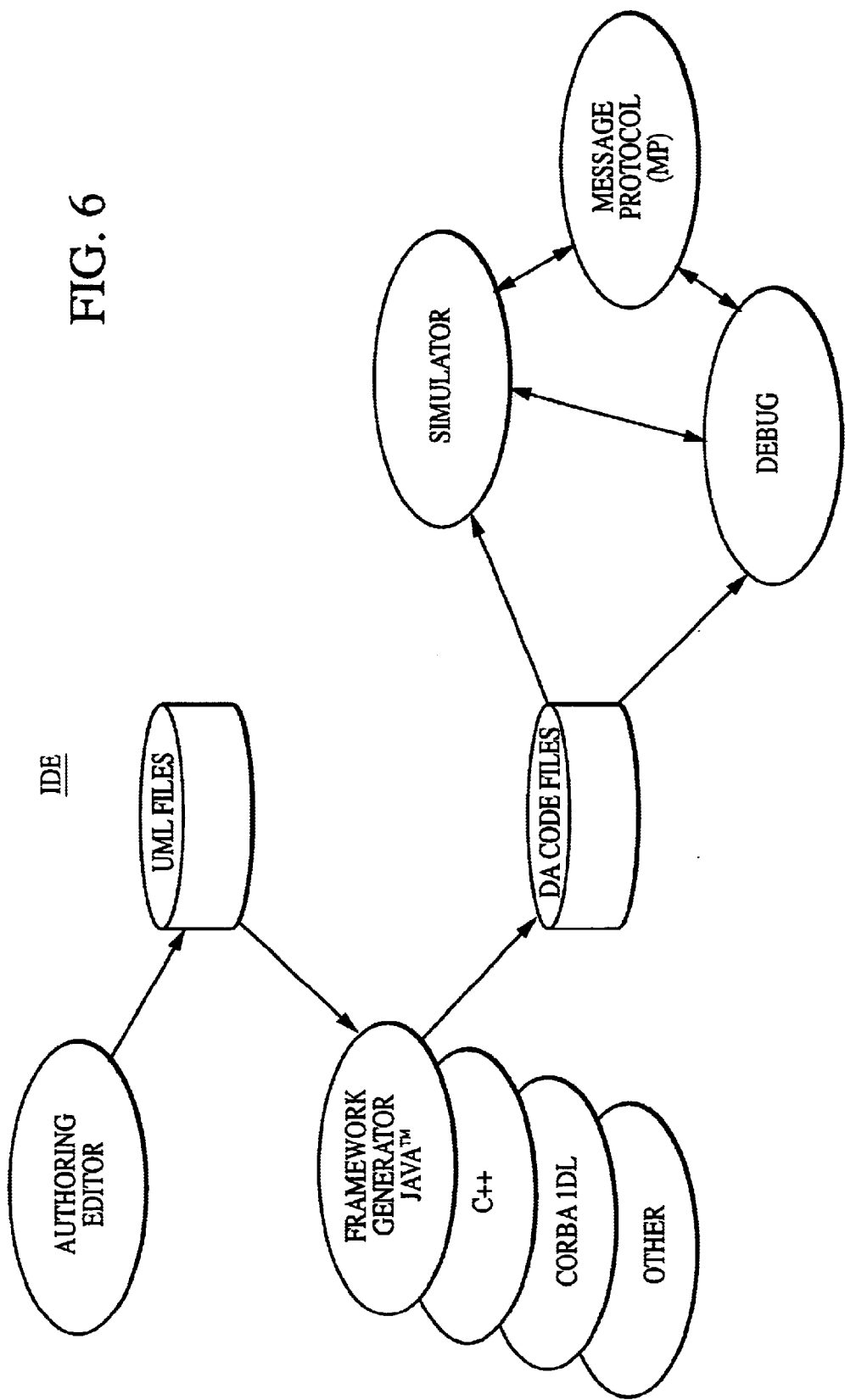
FIG. 6 is a logical block diagram illustrating the relationship between the various distributed application balancing interactive development environment (IDE) components according to the invention.

Along with the authoring editor and framework generator previously described, the IDE of the present invention includes a distributed application simulator and debug tool. The simulator provides an environment for simulating and testing distributed applications on a single development system. The debug tool is used in conjunction with the simulator or distributed applications running in the runtime environment described in greater detail below; it contains debug facilities such as break point setting, variable watches, etc., of the type well known in the software arts, yet adds further capabilities including tracking DACP and DASP communications via a specified link to the internal message protocol (MP) of the load balancing system, described in greater detail with respect to Tables 1, 2, and 4 herein. FIG. 6 illustrates the relationships between the aforementioned components of the IDE of the present invention.

Another feature of the IDE of the invention is that it allows distributed application authors to create applications that will automatically scale between the server(s) and client(s) at run-time. In general, such scaling permits the distributed application clients to download and maintain only those portions of the distributed application necessary to effectuate communication with the DASP, thereby maintaining the client portion as "thin" as possible. An example of where distributed application scaling is beneficial is in the context of a digital set-top box (DSTB). Per the FCC Telecommunications Act of 1996, Pub. LA. No. 104–104, 110 Stat. 56 (1996), future DSTBs are required to be retail devices. This requirement implies that DSTBs of varying hardware capabilities will be placed in the same MSO network. Applications that are downloaded to these DSTBs must be able to run effectively in hardware platforms that vary in performance, communications, and storage capabilities. If the DACP expects to use a reverse channel to communicate with the DASP, but the DSTB does not contain one, then the DASP of the invention will download additional functional components of the DACP and attempt to establish communication with the DASP via an alternate channel. Procedures for scaling the distributed application at runtime are described in detail in a co-pending U.S. provisional patent application, Serial No. 60/194,953, entitled "Method And Apparatus For Profiling In A Distributed Application Environment" filed Apr. 5, 2000, and assigned to the Assignee hereof, which is incorporated herein by reference in its entirety.

While the IDE and UML-based authoring editor described above are particularly well suited to the creation of distributed applications for load balancing in multi-client/server applications, it will be recognized that other development environments and editors may be utilized in conjunction with the load balancing methodologies and architectures of the present invention with equal success. Hence, the IDE and authoring editor described herein are but one exemplary approach to distributed application authoring consistent with the invention.

Runtime Environment

The distributed application previously described, whether authored using the foregoing IDE and authoring editor or another, is utilized within a runtime environment (RE) unit in the present invention to effectuate load balancing. As used herein, the term "runtime environment" generally refers to a system containing servers and client devices, interconnected via a wired or wireless network, where the infrastructure processes have been configured and started, and user specific applications may be selected by client devices and/or users of the client devices. In one exemplary embodiment, the runtime environment comprises the following individual components or modules: (i) a configuration process, (ii) a system process, (iii) a statistics process, (iv) a message protocol, (v) all of the participating servers, hereinafter collectively referred to as a "server farm," (vi) a runtime environment information database; and (vii) one or more distributed applications. These components are described in detail in the following paragraphs.

Figure 7:
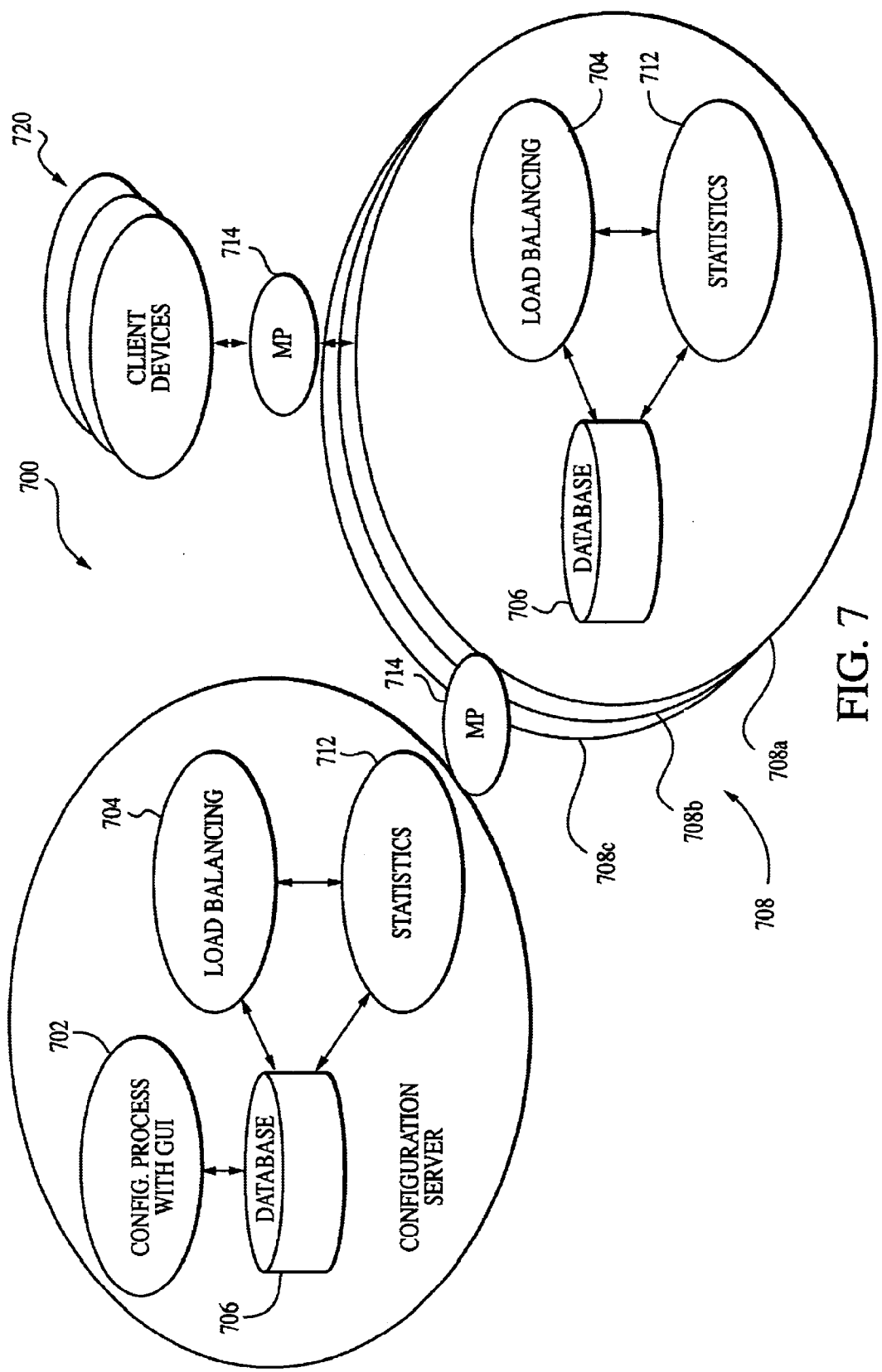
FIG. 7 is a logical block diagram illustrating the relationship between the various components of the runtime environment (RE) of the present invention.

FIG. 7 illustrates the distributed application balancing system process usage and relationship of various runtime environment components. The configuration process 702 of the RE 700 is used to modify the installed configuration of the distributed application components. A GUI process is provided so that a system administrator can make any desired changes from a machine that is local or remote to the configuration process 702. Possible changes include which server machines the RE runs on, and runtime configuration parameters for performance timeouts. The load balancing (system) process 704 dynamically balances load on the distributed application server portions (not shown) by consulting the statistics database 706 and communicating with the other system processes 710 in the server farm 708 and determining the best server machine on which to start the server portion.

The statistical process 712 constantly updates the statistics database 706 by querying other statistical processes in the server farm, as well as server machine local distributed application server portions for system statistics.

The message protocol (MP) 714 provides for communication between objects on different machines that is efficient, robust, and transparent to application specific objects. The message protocol 714 is described in detail in subsequent sections of the present disclosure.

The server farm 708 is comprised of the server machines 708*a*, 708*b*, 708*c* that have been installed with, and which are running the infrastructure processes of the runtime environment unit (RE) 700.

In one exemplary embodiment of the RE, each of the foregoing runtime environment modules run on all of the servers 708*a*, 708*b*, 708*c* in the server farm 708, except for the configuration process. The configuration process 702 may be run on one, some, or all of the servers in the server farm as needed. The configuration process 702 includes the aforementioned graphic user interface (GUI) of the type well known in the art that provides the runtime environment configuration manager with the means to modify all of the information associated with the runtime environment. This information includes, for example, application information, configuration parameters, and system information. Application information can control which client frameworks will be placed in a broadcast file carousel sent to the client devices, or alternatively could control which distributed application server portions (DASPs) are started automatic . Configuration parameters include values useful within the load balancing process 704, such as predetermined maximum communication timeouts that can be compared to actual timeouts. System information includes, for example, identification of the server machines in the server farm 708, the multicast address of the server farm, etc. All of the runtime environment unit 700 configuration information is stored in the system database 706 which is typically resident in each server in a server farm. In addition, both the configuration and system database can be run on a remote server outside the server farm. Whichever server or servers are running, the configuration process become a configuration manager (CM). FIG. 7 shows one embodiment of a configuration manager arrangement. The primary difference between the configuration manager and any other server in the server farm is that the configuration process and GUI are running on the configuration server. In addition, a configuration manager could be remote, only running the configuration and GUI processes, and communicating with the rest of the servers in the farm. Servers that are part of a server farm 708, but are not configuration managers, optionally maintain copies of the configuration parameter records in their respective system database(s) 706. Each server in a server farm requests statistical messages be sent from other servers via the message protocol (MP) 714, and store the information in their local database.

Note that the DASPs 306 and DACPs 308 of FIG. 3 are not explicitly shown in FIG. 7. DASPs can run on any of the servers in the server farm 708 and DACPs can run on any of the client devices 720 that can access the server farm.

As referenced above, the runtime environment unit 700 of the present invention further includes a communications system for DACP to DASP communications utilizing a message protocol (MP) 714. The message protocol is designed to be efficient in terms of message size and the number of messages being sent. The message protocol 714 of FIG. 7 is comprised of several sub-component message protocols. These include messaging protocols for DASP to DASP statistical discovery, DASP to DACP application communications, and DACP to DACP cooperative application communications. Each distributed application balancing system statistical process uses statistics gathered via DASP to DASP communications. This feature allows one server to instantiate a DASP object on another server when its resource wait timeouts are being exceeded and the other server is indicated as the best (or otherwise desirable) performance option as determined by the statistics. The message protocol of the invention is described in greater detail below with respect to Tables 1, 2, and 4.

Figure 8:
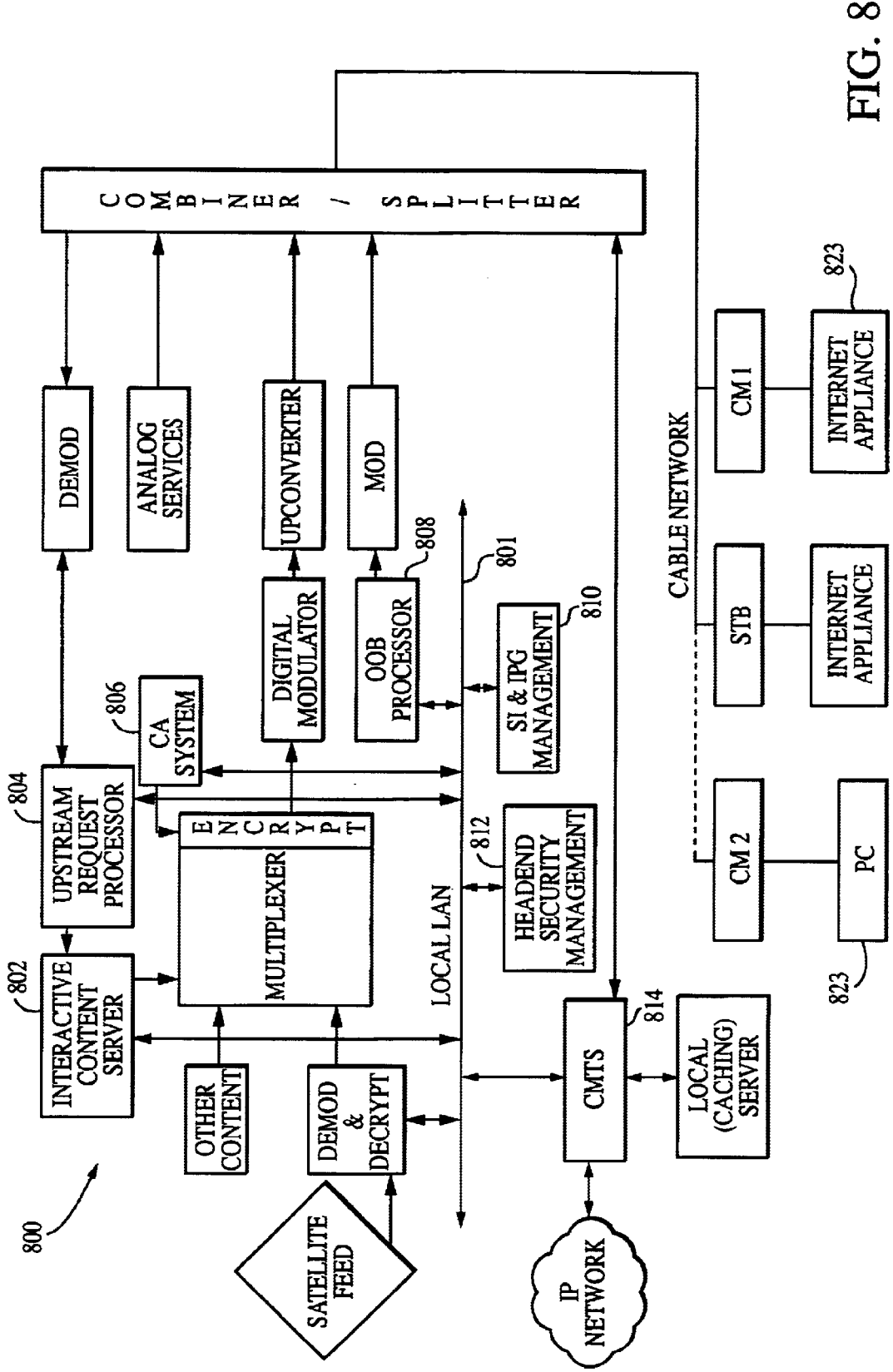
FIG. 8 is a block diagram of one exemplary embodiment of an MSO head-end cable network architecture capable of implementing the runtime environment of FIG. 7.

A generalized head-end interface architecture 800 is shown in FIG. 8. The figure illustrates the core systems that are incorporated into most Internet-connected head-end systems. The local LAN 801 of the illustrated head end architecture 800 is an MSO in-house bus-configuration Ethernet network, although it will be recognized that other types of data networks (e.g., token ring, ATM, SONET, etc) and other topologies (e.g., star, ring, etc.) may be used. Data networks are well known in the networking arts, and accordingly are not described further herein.

Depending upon the type of application(s) running, the runtime environment unit 700 of the present invention may interface with a number of different elements of the head-end network 800 including the interactive content server 802, the upstream request processor 804, the conditional access (CA) system 806, the out-of-band (OOB) processor 808, the system information (SI) and interactive program guide (IPG) management system 810, head-end security management system 812, and cable modem termination system (CMTS) 814. These elements, along with others shown in FIG. 8, are the primary systems used to deliver clear or encrypted content, as well as resident firmware/software upgrades and software applications, to the end-user consumer devices 823. They also comprise the primary systems used to receive user input from the consumer devices 823 sent back to the head-end. The conditional access system 806 is used to create the encrypted content on the head-end, and to decrypt the content sent from the consumer devices.

Note that the server portions of the distributed applications should be disposed in a low latency path to their client portion counterparts. Therefore, the DASPs reside within or on a direct communication path with the upstream request processor 804, the interactive content server 802, and the cable modem termination system (CMTS) 814 shown in FIG. 8.

Figure 9:
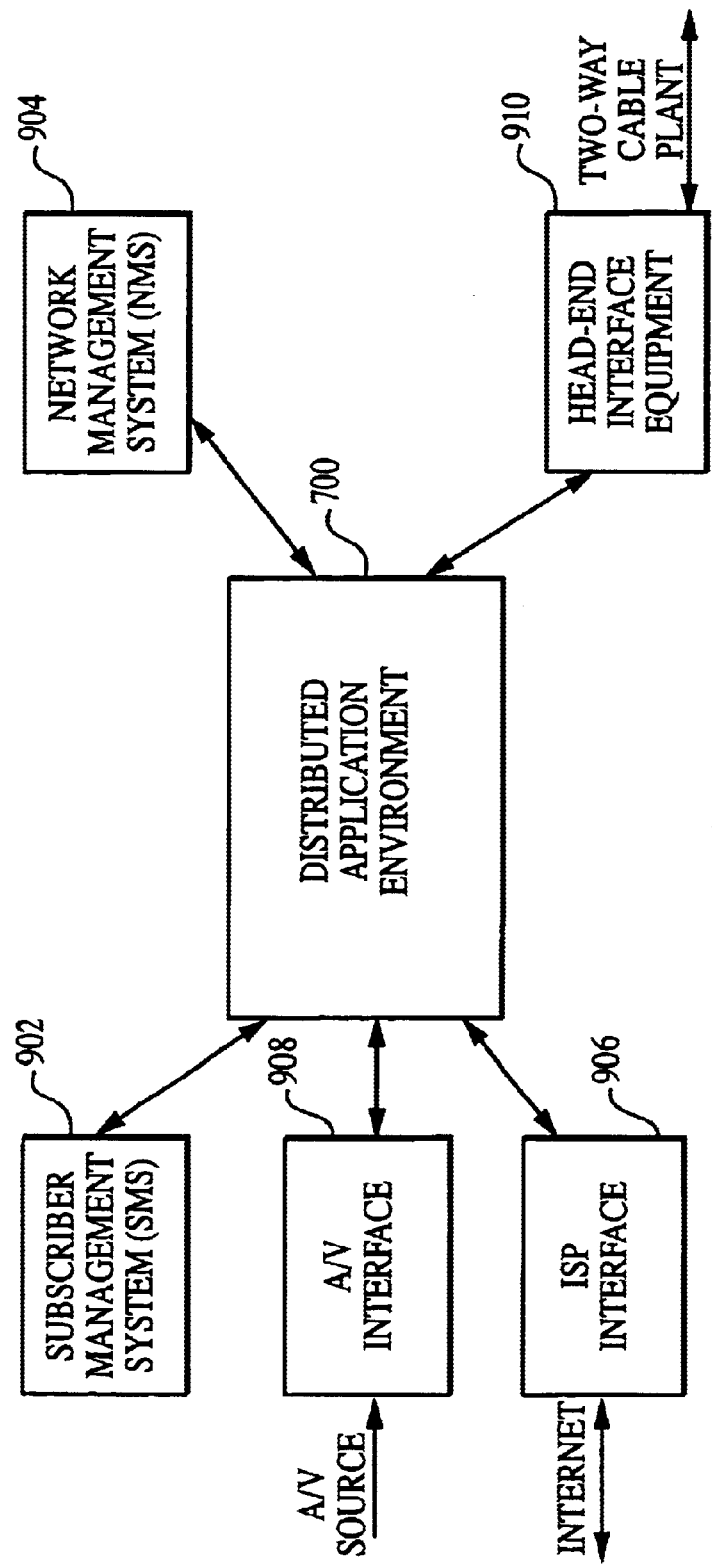
FIG. 9 is a block diagram illustrating the logical relationships between various components of the head-end architecture of FIG. 8 and the runtime environment of FIG. 7.

FIG. 9 shows the relationships of all of the head-end systems with the distributed application runtime environment 700 of the present invention. These systems may include, for example, the subscriber management system (SMS) 902, the network management system (NMS) 904, the Internet service provider (ISP) 906, and A/V interface 908. Each of these support systems are well known in the cable networking arts, and accordingly will not be described further herein. The head-end interface equipment 910 acts as an interface between the runtime environment unit 700 and the head-end equipment 800 previously described, as discussed in greater detail with respect to FIG. 10 herein.

Figure 10:
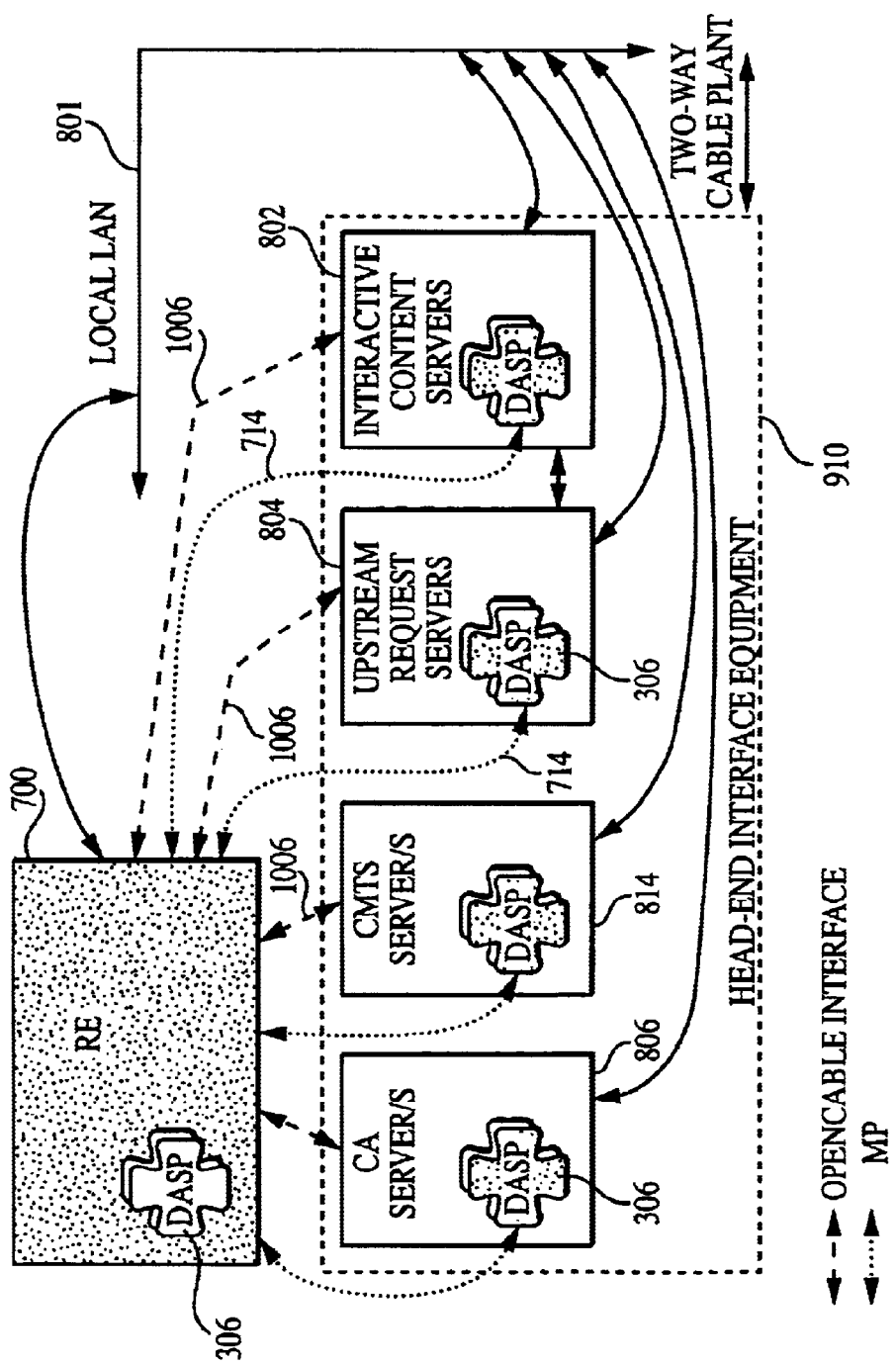
FIG. 10 is a logical block diagram illustrating the communication flow between the runtime environment of FIG. 7 and various servers present within the head-end architecture, including DASP-to-DASP communications via the message protocol (MP) of the invention.

FIG. 10 further illustrates the relationship between the runtime environment 700 and the core head-end systems 800, including communication paths between the various RE and head-end interface components. For each application, a DASP 306 can run in the runtime environment 700, the necessary core head-end system 800, or both; the difference being the physical server that the DASP runs in and the communications technique the DASP uses to send messages to any entity outside itself. For example, in one embodiment, an e-commerce application utilizes a "thin" DACP in the client devices. The DACP presents a GUI for purchase information input, formats the user's input, and sends the information to the DASP. The DASP 306 is positioned in the upstream request processor 804 so that the DASP can process the user's information as soon as it is received at the head-end. It can then send the information to another DASP within the runtime environment 700 for further processing, request a transaction directly from one of the other head-end systems, or process the entire transaction itself. Once the transaction has begun processing, the receiving DASP may forward the response to another DASP or it may respond directly to the DACP that sent the request.

When a DASP 306 is running in one of the head-end core system servers 802, 804, 806, 808, 810, 812, 814, it uses the message protocol (MP) 714 described below to communicate with system processes running within the runtime environment 700 and other DASPs. In addition, the DASP uses OpenCable compliant local interfaces 1006 to communicate with services running on the same head-end system 800, and OpenCable compliant network interfaces (as illustrated in FIGS. 9 and 10) to communicate with services running on external head-end servers. When the DASP 306 is running in the runtime environment 700, it uses the message protocol (MP) 714 to communicate with all other processes within the runtime environment and DASPs running in head-end systems. In addition, the DASP uses OpenCable compliant network interfaces to communicate with services running in head-end systems. Since multiple applications will have multiple DASPs running in various locations, the situation may often occur where the runtime environment will be communicating with head-end systems using both message protocol and OpenCable interfaces simultaneously.

The load balancing process of the present invention provides for distributed application startup and downloads to clients that request the distributed application, or clients that are "targeted" to receive the distributed application based on a runtime environment event. In one embodiment, such targeted clients can be configured based on MPEG (motion Picture Experts Group) transport stream contents, time-of-day, other network data contents, or other parameters selected by the distributed application author.

Figure 11:
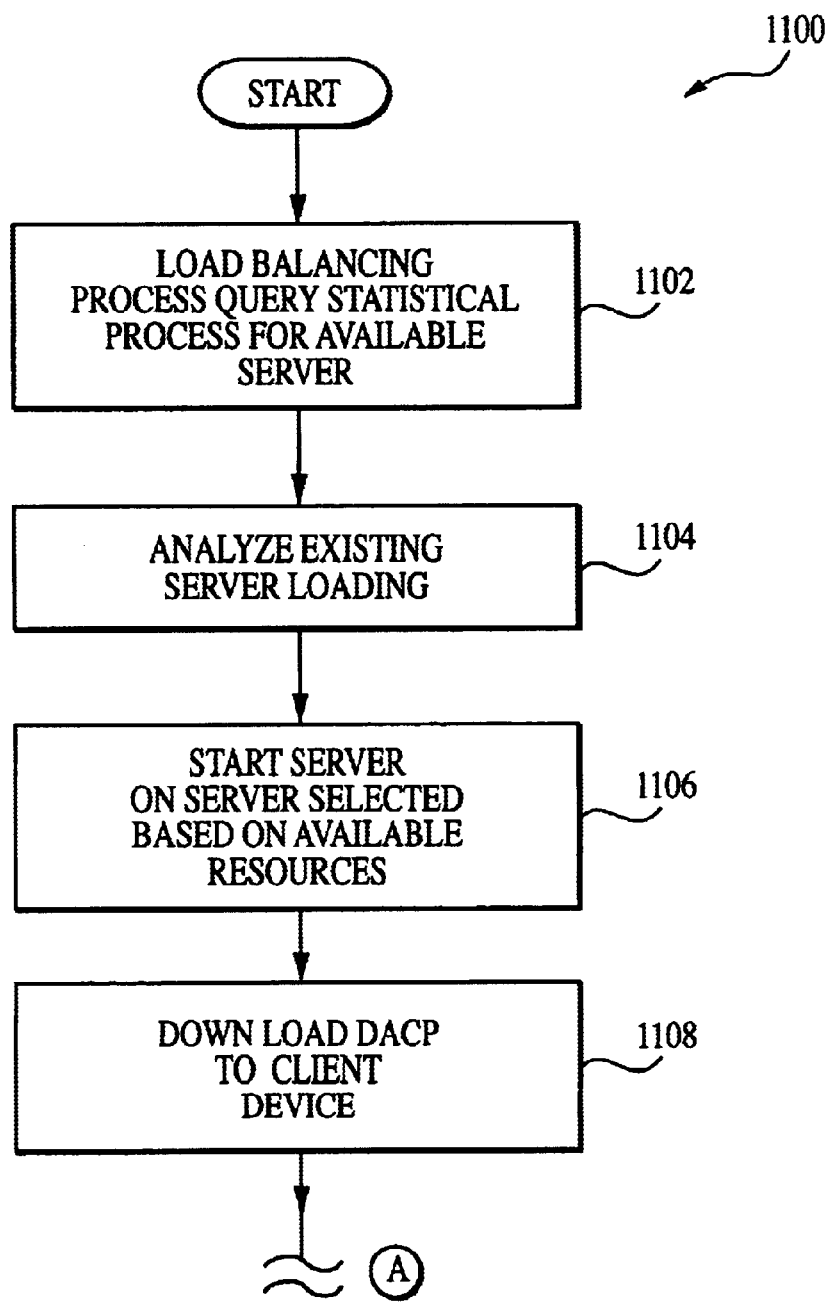
FIG. 11 is a logical flow diagram illustrating one exemplary embodiment of the method of downloading and starting a DACP according to the invention.
Figure 11:
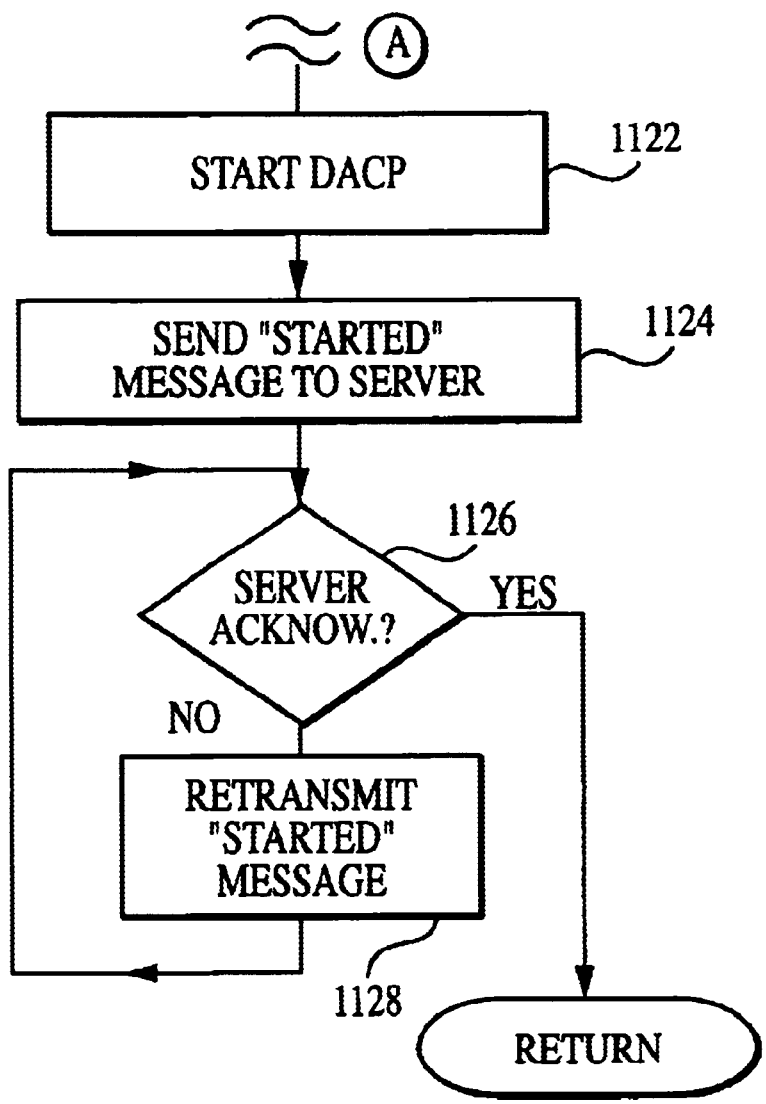
Figure 12:
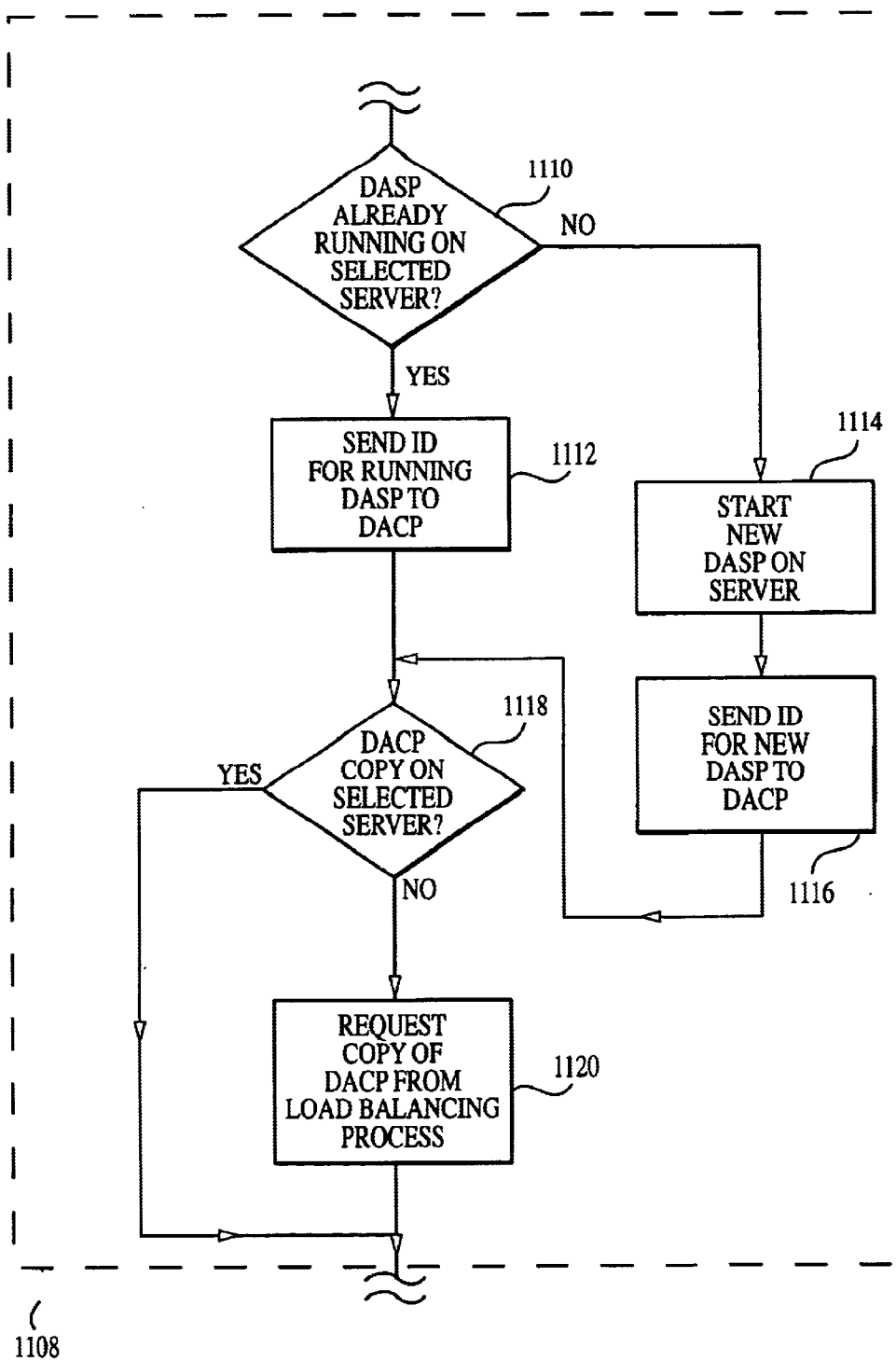
FIG. 12 is a logical flow diagram illustrating one embodiment of the method of downloading the DACP to the client device according to FIG. 11.

The method of distributed application startup and download is now described with respect to FIGS. 11 and 12. As illustrated in FIG. 11, the method 1100 begins with the load balancing process 704 (FIG. 7) queries the statistical process 712 in step 1102 for an available server based on the current server's resource availability. In steps 1104 and 1106, the existing server loading is analyzed, and a DASP is started on the server that indicates the best CPU performance in the server farm, along with minimum capabilities for all of the other resources; memory, hard-drive, etc. The minimums are determined by configuration parameters. Next, in step 1108, the load balancing process 704 downloads the client portion of the distributed application to indicated client(s), passing the DASP's unique ID, so that it may be used for message protocol communications.

In one embodiment (FIG. 12), the DASP unique ID is a virtual address that is mapped by the message protocol to a physical address. If a DASP for that application is already running on the chosen server (step 1110), the load balancing process sends the unique ID for that DASP to the DACP per step 1112. If the load balancing process cannot find a DASP for that application, it will start a new one per step 1114, and send the unique ID for it to the DACP per step 1116. The available servers should already have a copy of the DACP stored on it (step 1118). If not, it will request a copy from the load balancing process on the originating server per step 1120, which will acquire it from its database 706.

When the client portion of the distributed application is started per step 1122 (FIG. 11), it will send a started message to the server per step 1124. This message will be retransmitted (steps 1126, 1128) until the server responds. As with "bootp" (a client boot protocol well known in the network programming arts), the client will retry using ever-longer timeouts, to avoid burdening the network with requests that may be futile.

In the present invention, runtime environment applications are split and distributed using objects as previously described. Furthermore, in order to provide the load balancing capability, the authoring editor (AE) creates DASP objects using a thread-oriented framework that allows a single DASP to serve multiple DACPs. This functionality is essential in environments such as Digital Television (DTV) cable systems where the ratio of DACPs to DASPs cannot be limited to 1 to 1. If the ratio of DACPs to DASPs in such an environment were 1 to 1, server machines could quickly run out of thread resources. Hence, in the present invention, the DASP/DACP ratio is dynamic at run-time and based based on the configuration of the system, the number of servers, the number of clients, available server resources, and potentially other factors as required.

Each DASP object begins as a thread safe framework of code. As previously described, the authoring editor provides critical sections to protect resources such as memory, hard drive, I/O, etc., so that competing DACPs may share resources within a single DASP. An Operating System (OS) lock such as a semaphore, or queue, as programmed from the AE, protects each of the critical sections. For statistics gathering and further DASP distribution, each lock is able to return the resource type of the resource it protects. The invention in one embodiment employs a set of special locks, which collectively comprise an object that contains the OS lock, the resource type it protects, and the lock timeout value. The timeout value is set based on a system configuration parameter for locks that protect the associated resource type. If the lock times out, then another DASP is spawned. In one embodiment, this new DASP is spawned on the server that indicates the lowest usage for that resource type, which may actually be the same server that the "locked" DASP was running on. If a bottleneck is being caused by too many DACPs trying to access the CPU resource in one DASP, spawning another process for the same DASP occurs on the same server machine when the statistics indicate that the current server machine has sufficient CPU bandwidth remaining. The same server machine may be used even when statistics indicate that another server machine has more CPU resources available. This approach is used in the present embodiment in consideration of the trade-off in overhead incurred when distributing a DASP to another server machine versus continuing to run on a lower performance server machine. It will be recognized, however, that the system designer may choose to configure the system such that new DASPs are distributed to different servers with greater resources despite the associated overhead.

If a distributed application was authored using a vertical split in the DASP processing, the framework generator may be configured to generate two sets of threads for it; i.e., a first that runs on a single CPU system, and a second that runs on a multi-CPU system. The single CPU DASP code is unified and the split effectively ignored. The multi-CPU code contains an interface between the split, as defined by the message protocol (MP), such that the DASP can advantageously be spawned once for each CPU in the system. The framework generator is advantageously configurable for system specific requirements regarding this feature. For example, some operating systems allow processes to be assigned to a specific processor, while others do not. The single CPU and multi-CPU code is therefore placed in a single distributable DASP image. When the DASP initializes, it determines the CPU capabilities of the server machine it resides on, and subsequently spawns threads appropriate for the hardware configuration.

Because OS lock timeouts are important to the accurate performance of the runtime environment, some forms of Java are not sufficient. While the invention disclosed herein is optimally language agnostic, some forms of Java may be required to use the JavaNative Interface (JNI), and employ "C" or "C++" methods that can deterministically provide the timer functions. Such deterministic methods are readily developed by one of ordinary skill in the programming arts, and accordingly will not be described further herein. Similarly, it is noted that "real-time Java" of the type currently available may be substituted for these deterministic methods.

In the runtime environment 700 of the present embodiment (FIG. 7), the creation of a server farm 708 is accomplished by starting the load balancing 704, database 706, and statistical processes 712 on each server 708a, 708,b, 708c in the farm. Once all of the servers are started, they each send multicast messages to a pre-configured group address. In this fashion, each of the servers in the server farm is able to discover the other servers. The load balancing and statistical processes in the present embodiment only communicate with the other servers in the farm, as configured by the configuration process 702. For example, in a DOCSIS system, a single Cable Modem Termination System (CMTS) serves X cable modems and Y set-top boxes. A server farm for that CMTS would comprise only the servers on the network (e.g., Ethernet) side of that CMTS, between the CMTS and any other routers or servers, that have the runtime environment processes running on them.

Distributed Application Balancing Message Protocol (MP)

The message protocol used with the distributed application balancing methodology of the present invention is now described with reference to FIG. 13.

As previously described with respect to FIG. 4, a set of APIs (partitions) are defined which split distributed applications along vertical and horizontal functional "fracture" lines 402, 404. Horizontal partitions are referred to as peer partitions, and vertical partitions are referred to as client/server partitions.

Figure 13:
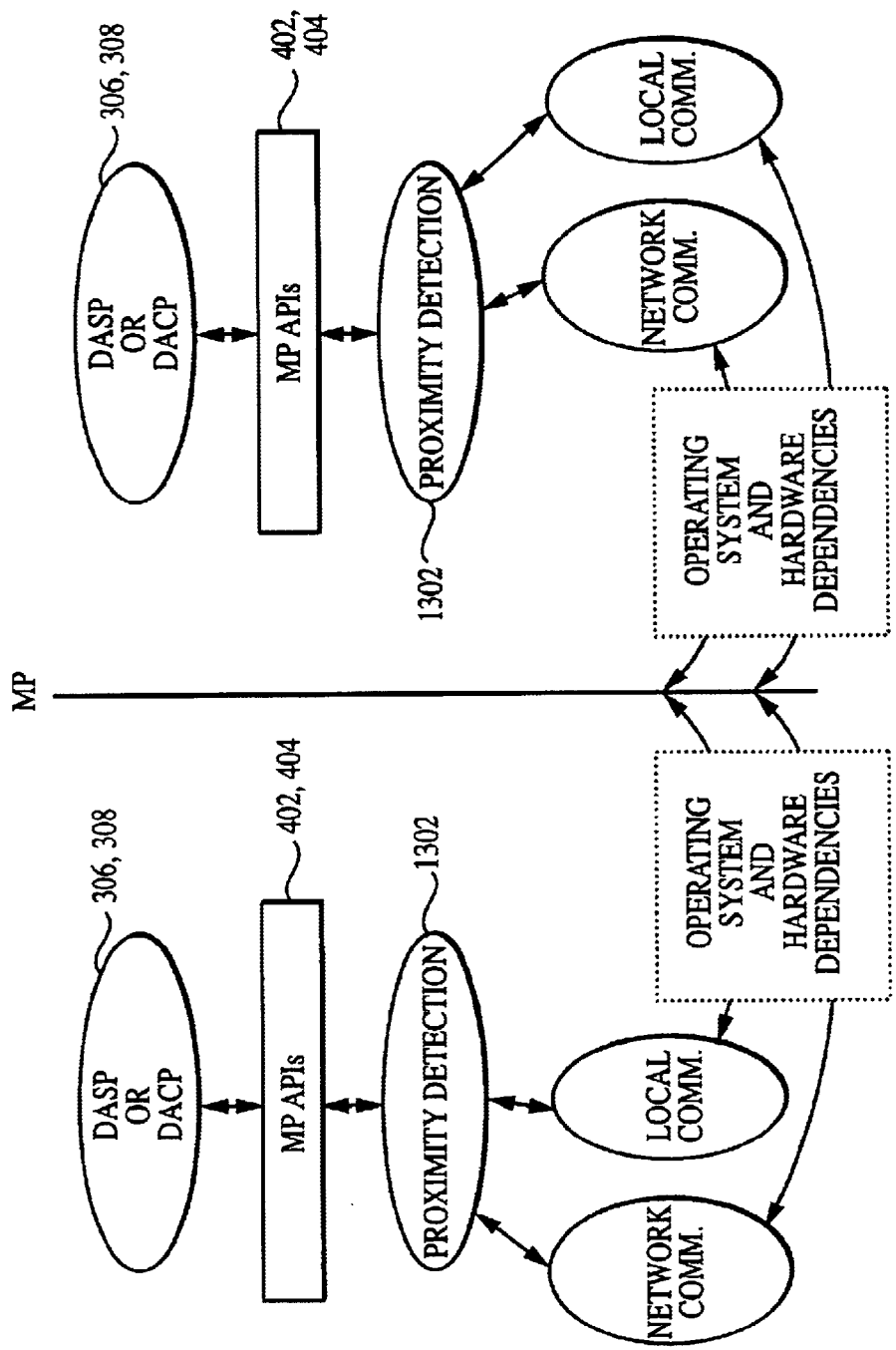
FIG. 13 is a logical block diagram illustrating the relationship of DASP/DACP modules, APIs, the proximity detection object (PDO), and the available communication channels according to the invention.

One element in transparent communications, underlying these API sets, is the distributed application proximity detection object (PDO) hierarchy illustrated in FIG. 13. As used herein, the term "proximity" refers to the physical location of one portion of a distributed application in relation to another. The PDOs 1302 must be able to determine the location of a distributed application portion with respect to another distributed application portion in many possible distributed application balancing system network configurations. Examples of these possible configurations include: (i) two parts of the same DACP that are running within the same thread context on the same hardware device; (ii) two parts of the same DACP that are not running within the same thread context, but are running within the same task context on the same hardware device; (iii) two parts of the same DACP that are not running within the same task context, but are running on the same machine; (iv) two parts of the same DACP that are not running on the same hardware device; (v) a DACP from one distributed application and a DACP from a different distributed application running on the same hardware device; (vi) a DACP from on distributed application and a DACP from a different distributed application running on different hardware devices; (vii) a DACP from one distributed application running on one hardware device and a DASP from the same distributed application running on another hardware device; (viii) two DASPs of the same distributed application running on the same server; (ix) two DASPs of the same distributed application running on different servers; (x) two DASPs from different DAs running on the same server; or (xi) two DASPs from different distributed applications running on different servers.

In addition to the capability of authoring distributed applications so that the many communications possibilities listed above are transparent to the application author, the message protocol (MP) of the present invention also allows certain portions of applications to be moved at run-time, among the configurations listed above, without necessitating re-authoring. In other words, the distributed applications are scaleable as previously described because the message protocol allows for pieces of applications to be moved from server device to client device, and from different thread contexts to the same contexts, without specifically authoring multiple communications methods for the same code. This ability to move distributed application portions dynamically is accomplished in the present invention by using a set of communication API frameworks (i.e., vertical and horizontal fracture lines 402, 404 of FIG. 4) and the previously described "mutable" objects, although other approaches may be employed. The APIs are layered on top of implementation specific objects so that the top layer is "agnostic" or independent of operating specifics, hardware implementation, and the physical location relationship of the two communicating distributed application portions. Furthermore, the lower layers or implementation specific layers of the message protocol (MP) dynamically change their behavior when the physical location relationship of the two communicating distributed application portions changes at runtime. For example, when two DACPs from the same distributed application are located on different hardware devices and an event causes one DACP o be moved to the same hardware device as the other, the involved message protocol objects detect the location proximity change and adjust their behavior accordingly. If a mutable object is moved and becomes local to a DACP it will substitute for a partition, most probably a network partition, and run in thread context of the DACP.

It will be recognized that while the exemplary embodiment of the runtime environment described herein utilizes one or more proximity detection objects 1302, distributed applications used with the invention may be authored such that proximity detection is not required, thereby eliminating the overhead associated with the PDO algorithm. This is accomplished by, for example, fixing the locations of the objects at application startup and authoring the applications so that the partitions assume a particular type of connection, such as a network. Other approaches to obviating proximity detection may also be employed consistent with the invention.

The message protocol (MP) of the invention further assigns virtual addresses (VAs) to DASPs and DACPs, so that distributed application portions can move dynamically within the distributed application balancing system network. Servers associated with the distributed application balancing system network have records, for example, in their respective distributed application balancing system databases 706 that contain this dynamic mapping of virtual addresses. Clients on the network are only given those virtual addresses necessary to their communications needs. In one embodiment, however, clients can discover the virtual address of other DASPs and DACPs by sending a query message to the server farm 708. Discovery of such virtual addresses may be performed for, inter alia, identifying a well known server that provides a specific service, or to find applications of the same type running on other client devices.

Virtual addresses can be implemented in many forms; however, the virtual addressing of the present embodiment is implemented in a form that is compliant with the environment for which the message protocol is authored. For example, cable digital virtual addresses could be assigned a Uniform Resource Identifier (URI), as specified by the requirements of the World Wide Web Consortium (W3C) and related Request For Comment (RFC) documents, such URI being well known in the networking arts. The primary feature of virtual addressing in the present invention is its ability to uniquely identify the location of a distributed application portion anywhere within the distributed application balancing system network. Accordingly, the "granularity" (i.e., positional resolution) of the virtual address is structured so as to identify the location of a distributed application portion with respect to another distributed application portion within the same thread in the same client device, in a different thread on the same client device, or any thread in a different client device.

In order to create DASPs and DACPs that can reside in different physical locations at runtime, the proximity detection object 1302 is contained within each distributed application portion. While a PDO is defined for each DA portion in the present embodiment, it will be appreciated that the location of the portion to be communicated with can be conveyed using methods other than a PDO, such as for example an absolute IP address, in which case the proximity detector processing becomes optional.

Referring now to Tables 1 and 2, one exemplary embodiment of the message protocol (MP) 714 is now described in detail. In the illustrated embodiment, the message protocol advantageously comprises the User Datagram Protocol (UDP). UDP is well known in network programming arts and will not be further explained herein. UDP is chosen over other protocols because of its efficient nature; however, the MP must also take into account the lack of guaranteed packet delivery or packet order reception. Note that in general, the message protocol of the present invention is targeted for captive networks that reside behind internet firewalls. Therefore, it does not have to be as robust to error recovery as other protocols such as the well known Transport Control Protocol (TCP).

In order to make UDP useful to in the present invention, a protocol-specific message header is defined, and the maximum guaranteed packet size for UDP, 512 bytes, is adhered to. The latter allows the MP to split up larger messages to enable guaranteed packet delivery, based on the fact that UDP will not break up the packets further. The message protocol of the invention employs a header that is as small as possible, yet still allows for many different types of possible application messages to be sent. Note that if an application message can't be sent using the message protocol header, the message protocol classes revert to Real-time Transport Protocol (RTP) or MPEG in Internet Protocol (IP). As is well known in the art, RTP allows for data that must be synchronized with time, such as audio and video, to be sent via a network. MPEG in IP is a technique for sending MPEG packets via an IP network. Both techniques have the drawback of comparatively larger overhead, and are therefore less desirable as the primary messaging format of message protocol than UDP. It will be recognized, however, that RTP and/or MPEG in IP, as well as other protocols, may be used as the primary messaging format of the message protocol of the present invention if desired, especially if other advantageous aspects of these protocols outweigh the foregoing limitations relating to overhead.

The message header format of the present embodiment is now more specifically described in terms of the following definitions. A bit, as used herein, defines the smallest computer memory location possible. A bit can contain one of two values, a 0 or a 1. If 1 the bit is said to be on, or high; if 0 the bit is said to be off, or low. A byte is a set of eight contiguous bits. Bits are numbered within a byte from 0 through 7, with 0 being the least significant bit (far right, read left-to-right within the MP) and 7 being the most significant bit (far left). A byte is the smallest number of bits readable or write-able in a computer's memory. Each byte is aligned with the CPU's data bus. In a multi-byte field, the most significant byte is in the left-most position as previously described. This is known in the computer art as "network-order." The basic message protocol header is formatted in field order for the preferred embodiment as illustrated in Table 1.

TABLE 1

| Field name | Size | Description |
| --- | --- | --- |
| Flags | 1 byte | Contains multiple fields that imply the format of the rest of the message: |
| Number of buffers greater than 1 | Bit 7 of the Flags field | If on, indicates that the number of buffers in the message is greater than 1. If off, the number of buffers is equal to 1. |
| Acknowledge | Bit 6 of the Flags field | If on, indicates that the message is an acknowledgement to the sent message indicated by the session ID and transaction ID fields. |
| Not Acknowledge | Bit 5 of the Flags field | If on, indicates that the message recipient detected a problem with the sent message indicated by the session ID and transaction ID fields. The sender should re-send the message. |
| Reply | Bit 6 and Bit 5 of the Flags field | If both bits are on, indicates that this message is a reply to the sent message indicated by the session ID and transaction ID fields. |
| Version number | Bits 0 through 4 of the Flags field | Indicates the version of the message format. Values can go from 0 to 35 and will wrap back to 0 at 36. |
| Command Type | 2 bytes | Indicates the command type that this message should invoke on the recipient machine. The commands 0 through 255 are reserved for system commands, the other values can be used for application specific commands. |
| Session Id | 1 byte | Indicates the session number given to the application by the server via the open session reply message. |
| Transaction Id | 1 byte | A number assigned to the current transaction. Each transaction consists of multiple messages with a send a reply and acknowledgements being typical. |
| Sent time | 3 bytes | Time that the message was sent. |
| Encryption | Bit 7 of the most significant byte in the Sent time field. | If on, the message is encrypted. The encryption algorithms, and data format are specified between each DASP and DACP using the start, ("open session command"). |
| Cyclic Redundancy Check (CRC) | Bit 6 of the most significant byte in the Sent time field. | If on, indicates that the last byte in the message is an 8 bit cyclic redundancy code (CRC). |
| Minutes | Bits 0 through 5 in the most significant byte of the Sent time field. | System time minutes of the time the message was sent. |
| Seconds | Bits 2 through eight in the second most significant byte in the Sent time field. | System time seconds of the time the message was sent. |
| Milli-seconds | Bits 0 through 8 in the least significant byte and bits 0 and 1 in the second most significant byte in the Sent time field. | System time milli-seconds of the time the message was sent. |

The total number of bytes in the basic header of the illustrated embodiment is 12, so the header only consumes 2.3 percent of each 512 byte data packet. If the field "Number of buffer greater than 1" is selected "on," then the multi-buffer header is added just after the basic header. The multi-buffer header only adds 4 bytes making the percentage of header equal to 2.7 percent. One embodiment of the multi-buffer header format is illustrated in Table 2.

TABLE 2

| Field name | Size | Description |
| --- | --- | --- |
| Buffer number | 2 bytes | Number of the buffer in this message from 0 to 65535. |
| Total number of buffers | 2 bytes | Total number of buffers in this message. |

The multi-buffer header is placed in every buffer in a multi-buffer message. The buffer number is used to reconstruct the message in the correct buffer order.

As previously described, the message protocol (MP) underlies and is transparent to the application. Each application will start a network partition for each client/server connection. Peer connections can be proprietary, and accordingly may use a protocol other than the MP disclosed herein. Whenever a network partition is created by an application, the partition first sends an open session message to a corresponding DASP, if it is in possession of the DASP's virtual address, or alternatively sends the open session message to a server farm virtual address. The server farm virtual address is converted to an IP multicast address. IP multicast addresses are well known in the arts and will not be discussed further herein. The DACP of the illustrated embodiment uses the reserved command-session ID value of "0". The server farm chooses a DASP for the DACP, or creates one if one is not available for the DACP's application, and forwards the open session message to it. The DASP includes within the open session reply an unused session ID and encryption specification, and subsequently returns this to the DACP. The encryption specification includes the size of the keys, the key exchange technique, the encryption alogorithm type, and the format of the digital signature, although other information may be provided. This format of the encryption specification is configurable and is specified by the message protocol (MP) end user. This approach allows for proprietary conditional access systems defined by third parties to be incorporated into and conveyed by the message protocol.

Once the DACP receives the open session reply, it begins application specific communications with the DASP. Message senders can use the IP address/port pair that was received in the "open session reply". DASPs can attach the IP address/port pair received in the "open session" command to the session object created for the DACP. The configuration and use of IP address/port pairs is well known in the network programming arts and will not be discussed further herein. Partitions in the illustrated embodiment make a best effort to guarantee delivery of messages by waiting for an acknowledge for each message, re-sending the message if the acknowledgement (ACK) isn't received within a predetermined period of time, re-sending if a non-acknowledgement (NAK) message is received, and restoring a multi-buffer message to a single buffer that contains all of the multi-buffers in the correct order. Multi-buffer messages can be sent out of order because each buffer contains the multi-buffer header. The receiver uses a bit-set to indicate which buffers it has received and to tell when all of the buffers have been received. Bit-sets are well known in the programming arts. When the first buffer of a multi-buffer message is received, the receiving partition determines the size of the entire message and allocates a single large buffer for it. Each sent buffer is copied into the large buffer. The header information is only copied once into the large buffer, at the beginning of the operation. When the entire message has been received, the receiving partition places the message into a queue and informs the application portion thread that contains it. Multi-buffer messages are only be acknowledged (ACKed) when all of the buffers have been received. However, the message may be non-acknowledged (NAKed) when a problem is encountered with any one of the multi-buffer messages. When the sender receives the NAK, it restarts transmission of the entire message, re-sending all of the buffers.

When the sending partition has completed sending an entire message, it starts a timer waiting for the receipt of an ACK message. If the timer expires before the ACK is received, the partition resends the message. If the timer expires once more than a pre-determined "maximum number of re-attempts" parameter, the partition logs a system error with the server farm, discards the message, and returns a failure indication to the application specific function, so that application specific error recovery can be effected.

A sending partition sets the session ID in each message to the value it received in the "open session reply" command. It also increments a transaction ID number that is unique to the session. It further places the minutes, seconds, and milli-seconds of the current network time into the message "sent time" field. The receiving partition verifies that it has opened a session for the received session ID. If so, it creates a transaction for the message received. If not, it "NAKs" the message. The transaction tracks the status of the reply requested from the DASP and the ACK from the sending partition, once the reply has been sent back to it. When the DASP sends a reply back to the message originator, the reply must be "ACKed" by the message originator in the same fashion that the original message was ACKed by the recipient partition.

When a message is NAKed, the NAK sender inserts an error number just after the header. The NAK receiver can try to take appropriate action based on the error value. In most cases, the receiver is configured to rebuild and resend the message. This behavior is employed due to the fact that NAK error values can be misleading if the data received by the message recipient has been corrupted. If a message sender receives multiple NAKs for the same message, it shuts down the session and reopens it using the "open session" command previously described herein.

Each partition within the distributed application of the present invention can send and receive messages synchronously and asynchronously. For synchronous "sends" and "receives", a message sender sends the message, waits for the ACK, then waits for the reply all in the same function. An application can call the synchronous send in the partition, and the function will not return until it has either received a valid reply or detected an unrecoverable error. For asynchronous sends, the application calls a function that returns immediately. The application submits a function or object to the asynchronous send function as a parameter. The parameter function is called when a reply has been received or an unrecoverable error detected. This comprises the "callback" for the asynchronous message.

Each network partition may be configured to start a thread that is used to receive messages. The started thread may wait indefinitely for a message. When a message is received, the thread analyzes the message to determine if the message is a message protocol (MP) command message, an ACK or NAK, a message reply, or a new application message. This thread not only enables asynchronous application messaging, but also allows DASPs and DACPs to be controlled using message protocol (MP) commands. The "open session" command previously described is one example. Other command messages include, "get statistics", "close session", "application shutdown", and the like. Dependent on the type of network in which the message protocol (MP) is implemented, additional commands may be warranted for network centric operation.

If it is necessary for a mutable object to substitute for a network partition (see discussion of mutable objects previously provided herein), the application author can create an object for the network partition that inherits from the message protocol network partition. In one embodiment, this new object is application specific, and contains functions that match methods in naming conventions, return types, and parameter types of the mutable object. This information is known in the programming arts as the method's "signature." Utilizing this approach, when the containing application portion calls a function in a contained partition, the partition may be a downloaded mutable object that performs the operation locally, or alternatively may be a network partition that sends a message to the DASP for an operation reply.

If the partition is a named pipe of the type previously described instead of a network partition, the ACK/NAK protocol is not needed. Message replies are none-the-less timed to ensure that the responder hasn't terminated or is not caught in an infinite loop. Otherwise, the message protocol (MP) is the same for named pipe partitions as it is for network partitions as set forth above.

In addition to the foregoing, the message protocol (MP) of the invention further includes information relating to the "sent-time" of the message. In video streaming environments system time must be coordinated between servers and clients, and must be accurate to a comparatively high degree of precision (e.g., within a few hundred micro-seconds). The inclusion of sent-time information in the MP allows the server to make a true measurement of client message latency by subtracting its current time, as measured from the head-end system clock, from the sent-time that is embedded in the message (protocol) by the client portion prior to transmission to the server. By setting a system configuration parameter (e.g., MAXIMUM_MESSAGE_LATENCY in the present embodiment), a server portion can determine if it is approaching or exceeding a predetermined maximum latency value, and report this information to the system processes. By reporting this information to the system processes, the processes may control the allocation of client portions of the distributed application to the server providing the information. For example, if a specific server which has numerous associated DACPs (and client devices) reports a MAXIMUM_MESSAGE_LATENCY value greater than the prescribed limit, the system processes would not allocate any additional client portions to that server until the latency value was reduced below a prescribed "low water" mark, whether by attrition or reallocation.

It is noted that while the embodiment of the invention described above employs a "sent-time" parameter for estimating system latency, other approaches may be used with equal success. For example, latency could alternatively be measured as round-trip latency (i.e., from time of transmission from the client portion to receipt of a processing or acknowledgement message back at that client portion), or latency from time of receipt at the server portion (as indicated by some external indicia) until the processing request is completed. Many such alternatives are possible. Hence, as used herein, the term "sent-time" is meant to include all such variations adapted to determine latency within the system.

Timers

As previously described, one fundamental aspect of the present invention is a methodology for automatically distributing the load of the server portion of distributed applications among multiple threads on the current server machine or multiple server machines, such as the various server and client devices of FIG. 2. In order to facilitate this automatic load balancing, the invention utilizes two types of timers (i.e., a read timer and a write timer), and several types of system statistics. System statistics for CPU load, available memory, etc. are used in conjunction with the timers to assure optimum server load balancing of distributed application DASPs.

The "write" timer of the invention is the simpler of the two aforementioned timers from the standpoint of automatic load balancing. Whenever a server physical resource such as a hard drive is being written to, function calls provided by the operating system include a timeout parameter. Timeout parameters for various writeable resources can be configured by the distributed application balancing system. Such operating system calls only allow one write access at a time, providing a built-in wait-and-lock. The timeout is simple because if the write access times-out, the DASP may merely inform a distributed application balancing system load balancing process 704 (FIG. 7) or store the information in the database 706 as a statistic to be retrieved by the statistical process later. The load balancing process may accordingly spawn another DASP for the same distributed application and will at the very least not assign any more clients to the device that is reporting the timeout. No other processing is necessary. It is noted, however, that additional logic can be added to the simple write timeout just described, however. For example, in one alternative embodiment, the write timer of the invention is configured to provide multiple access attempts with a complex timeout pattern (e.g., increasing or decreasing timeout after each try). In this case, the timeout logic and timer parameters are contained in a timer object. Each timer object optionally maintains the timeout value, whether it will increase and decrease (and by what amount) at each timeout, as well as the number of times the timer has timed out during a predetermined interval.

The second or "read" timer associated with the invention is more complex than the write timer from the standpoint of automatic load balancing. When a read timer expires, it indicates that nothing is available from the resource being read. This type of information is not generally useful for load balancing. The distributed application balancing system of the present invention optimally requires information on the relationship between the rate of data being provided by the resource and the rate at which the DASP reader may process this data. This information is generated by, inter alia, detecting that the read timer has not expired. For example, the DASP handles processing request messages from one to many client portions of the distributed application using a wait-and-lock queue oriented read call. The DASP passes a timeout parameter to the read call. When the read call returns, either a message from a client was received, or the timer expired. If the timer does not expire after successive read calls, then the DASP is alerted to the fact that messages may be coming in faster than the DASP reader can handle them. In that event, the DASP informs the load balancing process 704, or stores the information as statistics for later retrieval. Message queues may be configured to allow the DASP to check how many messages are in a given queue. Along with timeout occurrences, queue loads can be saved as statistics to be used in load balancing algorithms. Parameters and logic must be associated with a distributed application balancing system read timer; thus the read timer is defined as an object. The read timer object of the present embodiment therefore contains (i) the first timeout value; (ii) the number of non-timed-out reads occurring before the load balancing process was contacted; (iii) a value to modify the timer value by after each non-timeout; and (iv) method calls that contain the operating system specific calls.

The timer types discussed to this point have been synchronous read/write timers. In essence, a synchronous timer is one that will make a call and wait for that call to return to determine if the timer has expired. However, as previously described, read/write timers may be asynchronous as well. With an asynchronous timer, the DASP makes an asynchronous read or write call and identifies the name of a function as a parameter to the asynchronous read or write, that the operating system will call when the read or write completes. The parameter may actually be an object that contains a method that will be called, as in the instance of a Java action Listener. The DASP asynchronous call returns immediately, and the DASP continues on with subsequent processing. When the read or write completes, the parameter function is called by the operating system. This feature is known as a "callback." When the callback is called, it must be able to determine for which client the asynchronous call was made. In the present invention, this functionality is in one embodiment accomplished via asynchronous timer objects. The callback is provided with an indication of whether the operation was successful or unsuccessful. If unsuccessful, the operation will be provided information relating to the reason, such as that the operation timed out. The distributed application author can advantageously program the callback to respond to the timeout in the same fashion as a synchronous timer, or take other action as desired.

Timer objects can be created for asynchronous timeouts, but the logic of an asynchronous timer differs from that of a synchronous timer. However, all DASP timers typically inherit from the same distributed application balancing system timer base class. Asynchronous timers calculate the duration between the call and the callback by storing the time of the call and subtracting it from the time of the callback, although it will be recognized that other techniques for calculating duration may conceivably be used.

As previously noted, an asynchronous timer callback must be able to associate the client that caused the DASP to make the asynchronous call, with the callback. Therefore, an asynchronous timer contains all of the attributes of a synchronous timer, plus (i) the callback reference; (ii) any parameters required by the callback, and (iii) a client unique identifier such as the client's address. If the callback can take the timer object as a parameter, the callback may readily associate the asynchronous event with a client. If the callback cannot take the timer object as a parameter, then the callback must be provided a reference to the unique identifier of the client.

Figure 14:
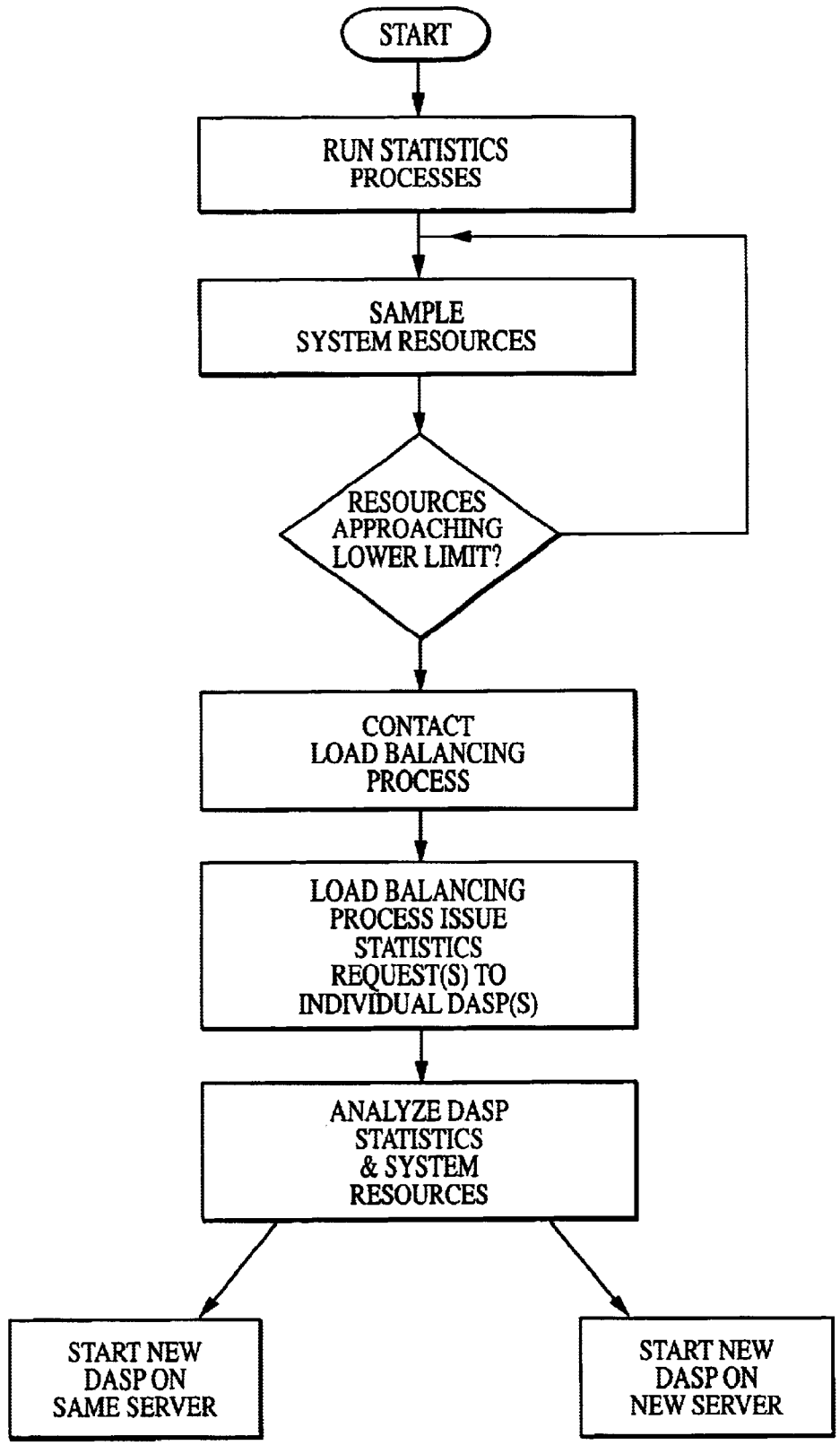
FIG. 14 is a logical flow diagram illustrating one exemplary embodiment of the method of balancing load of the server portions of the distributed application (DA) of the invention using server farm statistics.

The server portion of the distributed applications is load balanced among multiple threads and other server machines by employing the aforementioned timer logic, and by using system statistics, as illustrated in FIG. 14. The statistics process is run on each distributed application balancing system server (step 1402). The statistical process maintains server resource statistics for a number of different server parameters, including CPU usage, memory, permanent storage, external I/O, and the like. In the present embodiment, the load balancing 704 process starts a DASP whenever (i) a distributed application starts; (ii) a running DASP indicates timeout starvation indicating that it needs to be moved to a "healthier" server; (iii) a DACP is started on a client device and requests a corresponding DASP but none are available, or (iv) when system resources begin to get low. This approach is utilized such that a new DASP may be started before a slow-down of any significance occurs. When the statistical process detects waning system resources (e.g., such as approaching a predetermined lower resource limit) per step 1404, it sends a message to the load balancing process 704 per step 1406. Waning system resources are detected based on the statistical process' analysis of system resource data obtained by periodic inquiries from the statistical process 712 to its host server (as well as other servers in the farm 708), and inquiries issued to DASPs running on the host. Note that typically, a DASP does not report its statistics unsolicited to the statistics process unless a configuration parameter is being approached or exceeded, although it will be recognized that the DASPs may be so configured if desired by the distributed application author.

The message sent to the load balancing process per step 1406 prompts the load balancing process to issue a statistics request to individual DASPs (step 1408). Based on all of the statistical information that the load balancing process 704 has available, the load balancing process decides in steps 1410, 1412 to either start a new DASP on the same server, or start a new DASP on another server in the distributed application balancing system.

Exemplary Embodiment of the Invention

Figure 15:
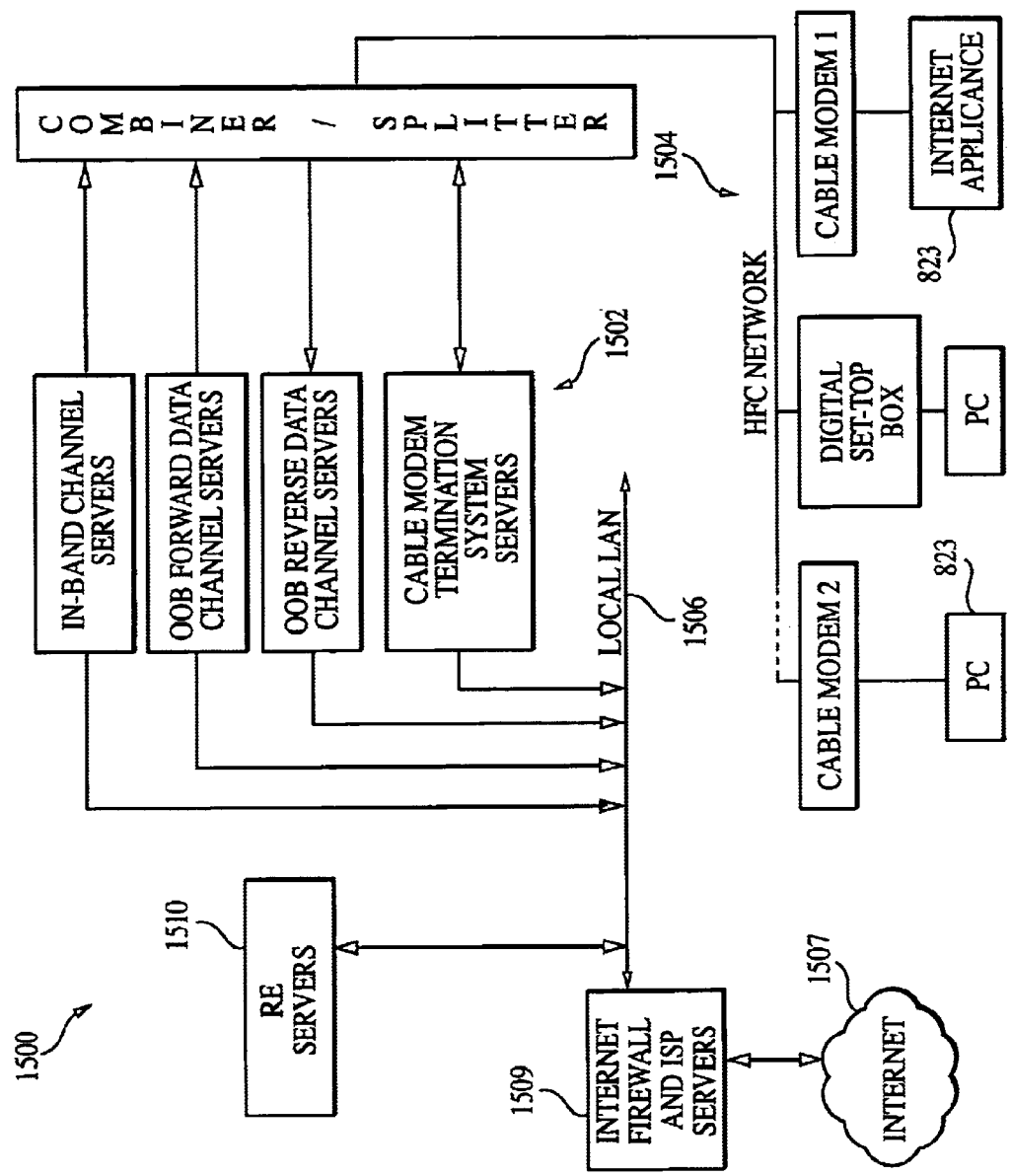
FIG. 15 is a block diagram illustrating the physical relationship of the runtime environment, local LAN, external network (Internet), and in-band, out-of-band (OOB), and CMTS servers in the head-end architecture of FIG. 8.

Referring now to FIG. 15, one exemplary embodiment of the architecture and methodology of the invention previously described is presented. As illustrated in FIG. 15, the system architecture 1500 comprises an OpenCable compliant digital cable MSO Head-end 1502 with a network 1504 of set-top boxes and terminal devices 823. Terminal devices may include cable modems, HDTV decoder boxes, or any other client device that meets with the OpenCable terminal device definition. The runtime environment 700 (including associated runtime servers 1510) of the invention interfaces with the head-end equipment via the LAN 1506 in the embodiment of FIG. 15. The LAN is also used to interface the runtime environment servers 1510 and other head-end components with an external network (e.g., the Internet 1507) via an ISP with firewall 1509 as illustrated. It is noted that while FIG. 15 shows the runtime environment servers 1510 as being physically separate from other MSO systems, distributed application balancing system processes may actually reside within other MSO servers. Under certain circumstances, placing runtime environment processes within the OOB and Cable Modem servers advantageously allows shorter response times between runtime environment processes or DASPs and DACPs, thereby increasing system performance.

Figure 16:
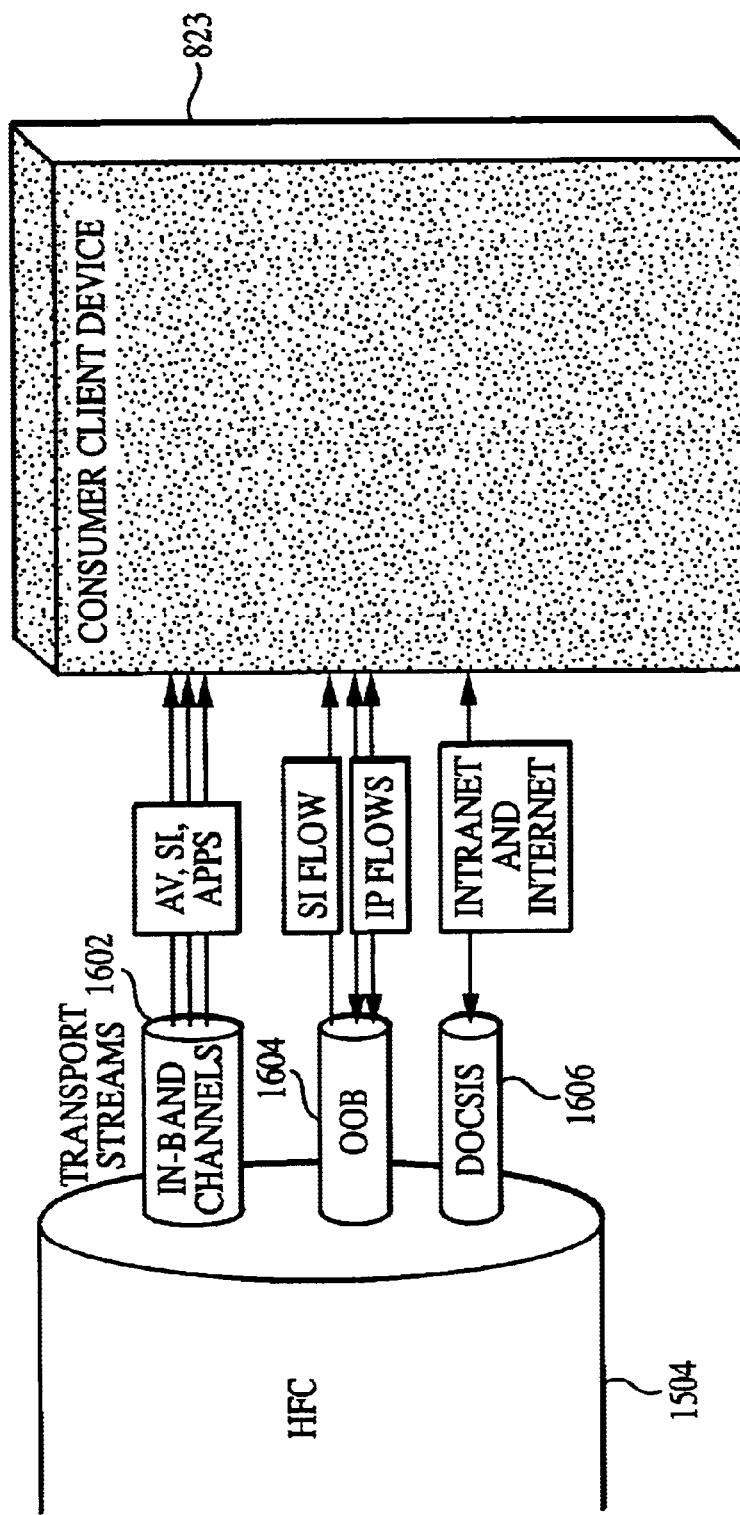
FIG. 16 is a graphical representation of the in-band, OOB, and DOCSIS (cable modem) streams present in a typical hybrid fiber-coaxial (HFC) cable network.

A hybrid fiber/coaxial (HFC) cable network 1504 such as that shown in FIG. 15 is distinguished from typical inter- or intra-networks in that multiple data streams, known as transport streams, co-exist on the same conductor in the cable network. For example, as illustrated in FIG. 16, a cable that comes to a consumer's house can have many of these channels 1602. Each channel can contain program elements such as audio/video (AV) information, data programs called applications (Apps), private tables of data defined by the MSO or various standards, system information (SI) tables that describe all of the other elements, as well as other information. These channels present on the cable are commonly known as "in-band" channels. The in-band channels are considered unidirectional because information can only flow from the head-end to the consumer client devices.

In addition to the aforementioned in-band channels, there is typically also one or more out-of-band (OOB) channels

1604 present, and potentially a Data Over Cable Service Interface Specification (DOCSIS) channel 1606, also commonly known as a cable modem. The OOB channel typically carries Apps, SI, and low-speed reverse channel data destined for the head-end. The client device creates data flows on the OOB channel for each type of data, SI, Internet Protocol (IP), etc. The low-speed upstream or reverse channel traffic can be used for a number of different functions, including for example consumer input to a head-end application, application bidirectional communications, and Internet traffic. The cable modem comprises a high-speed bidirectional data channel that can be used for intranet or Internet traffic including IP telephony, video conferencing, and the like. The DOCSIS standard defines security and Quality of Service (QOS) measures for cable modems as well.

A consumer selects an in-band program by changing the channels they have selected on their client device (e.g., television). An application may be associated with the in-band program that the consumer selects. The application may be an auto-start application that begins executing as soon as the in-band program is selected. Alternatively, the application may be triggered at some point after the in-band program is selected. The trigger may relate to an additional consumer input, a timer, an event contained within the transport stream, etc. Many different types of triggers, whether automatic or manual, software or hardware based, may be used consistent with the invention disclosed herein.

Like the in-band channels, traffic from the OOB and DOCSIS channels is received continuously. Unlike in-band channels, however, the OOB and DOCSIS channels are not selected (tuned to) by the consumer. The set-top box or terminal device tunes to these latter channels at initialization time and interacts with them over relatively extended periods of time. Applications contained within those channels may be started automatically by the client device without consumer intervention or knowledge, or some Apps may be started manually by the consumer. The consumer may start various applications by starting services that are available to them, such as an Internet browser, email, and the like.

In a distributed application balancing system environment such as a PC computing arena, a DASP is spawned on a server and the DACP is downloaded to the client device and started. Note that this is just one of several techniques that can be used consistent with the present invention to start a distributed application in an MSO environment. In an MSO environment, DACPs may be downloaded continuously to a client device on various channels. However, until the consumer selects the program that the DACP is a part of, the distributed application is never started. This implies that the DACP starts first, then informs the server farm 708 that it needs a DASP. If a DASP is not available, one is started in accordance with the methodology previously described herein. This type of DACP is referred to as a Transport Stream DACP (TSDACP).

When a TSDACP requests a DASP, the load balancing processes 704 on all of the servers in the server farm 708 execute a sequence of steps to select the server and the DASP that will respond to it. This selection sequence may involve multiple message sequences between servers, and starting a DASP on the selected server if one is not already started. The latency incurred with this sequence of events may be prohibitive for TSDACPs that require a low latency response to the DASP request. In this case, DASP records in the database 706 are optionally marked "start at initialization". The runtime environment starts one each of those DASPs so marked when it initializes, using the distributed application balancing system load balancing techniques previously described. In addition, DASP records may be configured to specify a sub-group of servers that a given DASP can run on. In this fashion, TSDACP requests for DASPs will be satisfied quickly as a DASP will already be started, and only a sub-set of the servers in the server farm will respond to the request. In an MSO head-end based distributed application balancing system, each TSDACP may be downloaded with the MP address of a load balancing process group. The load balancing process group consists of all of the load balancing processes 704 in the server farm that the distributed application will run within.

The MP address of the present invention may be embodied in a variety of forms. In one embodiment, the message protocol address implementation is an object that can contain all of the possible address forms. The MP address optionally contains one form of the address for when it is local, and a network form when it is not. The local form is used when both communicating entities are on the same machine. The form of the message protocol address may be a queue or pipe identifier, although other forms of address may be substituted. In the illustrated embodiment, the network protocol used for the MP is UDP, although it will be recognized that other protocols may be used. UDP is used to communicate between two runtime environment entities not on the same server. Therefore, the message protocol network address of a single entity can be an IP address/UDP port pair, or it can be a virtual address that maps to the pair. The virtual address may be a name that will map with a service like DNS, or alternatively may be a Universal Resource Identifier (URI) that can be parsed for distributed application balancing entity location. A message protocol address for a group of entities will be an IP multicast address. If IP addresses are dynamically assigned within the MSO network using a protocol such as DHCP, then a virtual address is used as an MP address in place of a direct IP address.

Note that the case may exist where a TSDACP will not contact the load balancing group to try and establish a DASP link. One possibility is that the TSDACP has been authored to be a stand-alone application with all of the functionality it requires embedded within it. Another possibility is that the TSDACP is part of a cooperative application whereby it will try and contact another DACP or TSDACP running concurrently on the same client device, or another client device within the MSO network. This results from the situation where not all applications require a server portion, or when a DACP communicates with the head-end using a peer interface that adheres to the OpenCable standard.

Figure 17:
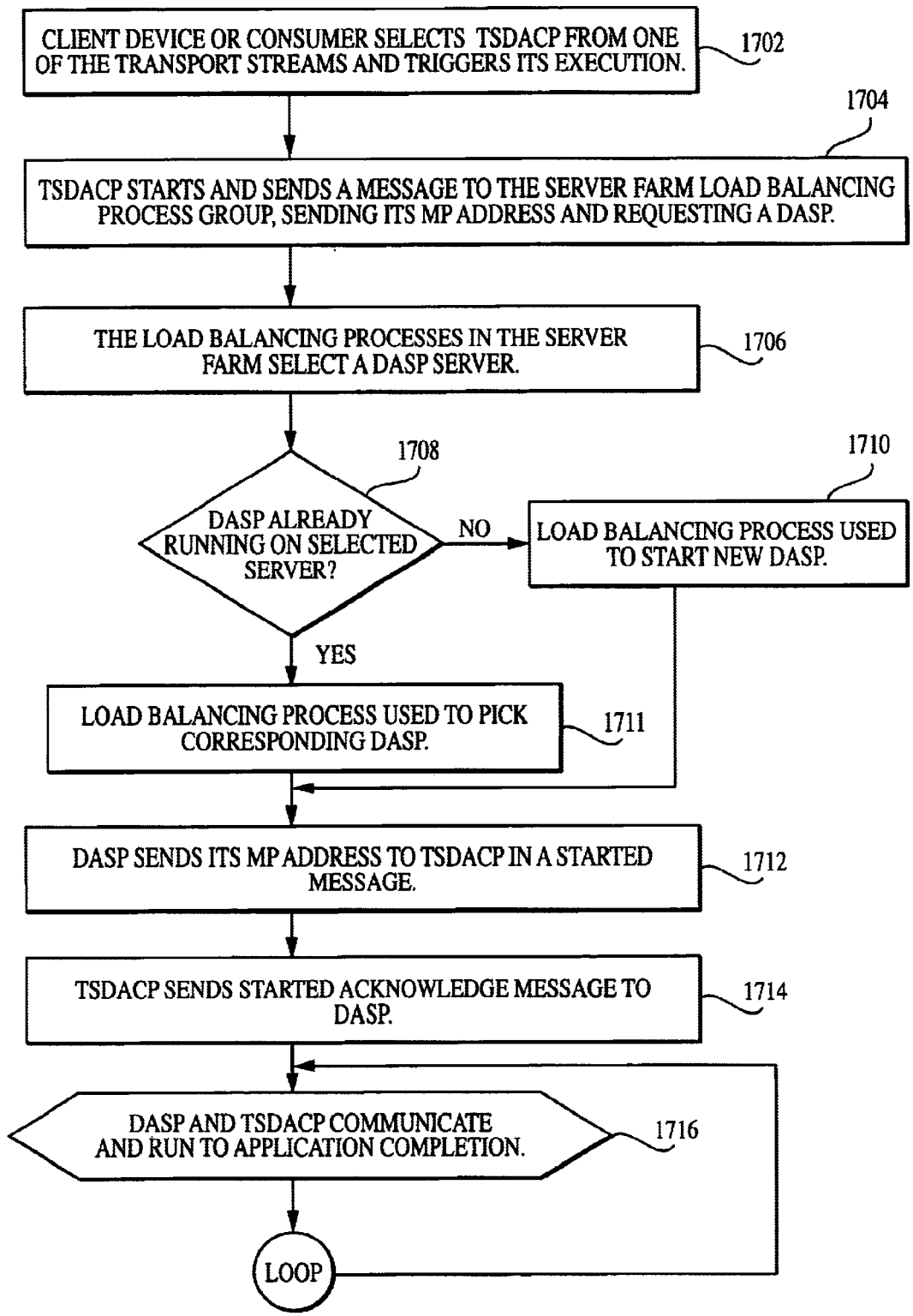
FIG. 17 is a logical flow diagram illustrating one exemplary embodiment of the method of establishing communications between a TSDACP and DASP upon DACP start-up according to the invention.

Referring now to FIG. 17, the method of establishing communications between a TSDACP and DASP when a distributed application starts is described. When the TSDACP is started on a client device (step 1702), it contacts the load balancing process group with its MP address and a request for a DASP (step 1704). The load balancing processes 704 within the server farm 708 will communicate with each other and select the appropriate server/load balancing process to handle the request (step 1706). The selected load balancing process starts the selected DASP if it is not already running (steps 1708, 1710, 1711). The load balancing process acknowledges the request to the TSDACP and gives the message protocol (MP) address of the TSDACP to the DASP that will correspond to it (steps 1712, 1714). The DASP and TSDACP then communicate and run the application to completion (step 1716).

It will be recognized that multiple approaches may be used to implement the method by which the load balancing processes 704 select or start a DASP for a requesting TSDACP (steps 1706–1711 of FIG. 17). One exemplary technique is to use a central registration authority. This authority is comprised of one or more processes. The authority processes are kept informed of the DASP statistics via the statistical processes 712. That information is used to determine the appropriate server and method for selecting or starting the needed DASP. Another technique is a "voting" method. In the voting method, the TSDACP sends the request to each load balancing process in the group and each load balancing casts some number of votes depending on how eligible it is to run the requested DASP. For example, if the server on which a load balancing process is running is already running the requested DASP and the resource usage of the server is not overly taxed, then the load balancing process would cast the highest number of votes possible. The highest voter is allocated the request. If two load balancing processes cast the same number of votes, the process with the earliest vote wins. The ballot time is accordingly included in the vote message. However, the aforementioned voting approach also may necessitate multiple rounds of messages being sent between the load balancing processes in the group, and hence may induce an undesirable amount of latency for some distributed applications.

When the TSDACP sends a DASP request message to the load balancing processes in a server farm, those processes must quickly and efficiently determine which server in the server farm is best suited to run the DASP. In the illustrated embodiment, this decision is based on the following three conditions: (i) server(s) reporting the lowest system statistics and already running one or more appropriate DASPs that report ready for new DACP service; (ii) server(s) reporting the lowest system statistics and not running a DASP for the distributed application, or alternatively running one or more DASPs, none of which are available for new DACP service; and (iii) server(s) not reporting the lowest system statistics which are already running one or more appropriate DASPs that report ready for new DACP service. As used herein, the term "lowest system statistics" refers to the server reporting the lowest resource usage, so that it is available for more workload. Examples or resources measured as part of the statistics analysis process include CPU usage, memory usage, and network usage. Statistics are typically measured in percentage of a resource in use at a particular point in time, although other approaches may be used with equal success.

The optimum server choice for DASP selection is the server reporting the lowest system statistics that also contains at least one DASP running above the minimum statistics required for new ACP service. A candidate DASP must be running above the minimum resource requirements for the DACP that desires it. Such a server is considered optimal since it can provide at least the minimum server resources required to service the DACP, and no new DASP is required to be started to provide such DACP service. If servers having higher system statistics and/or those without running DASPs are used, the system will be considered non-optimized, although it will be recognized that the present invention may be configured to operate in such a "non-optimized" fashion if desired.

Figure 18:
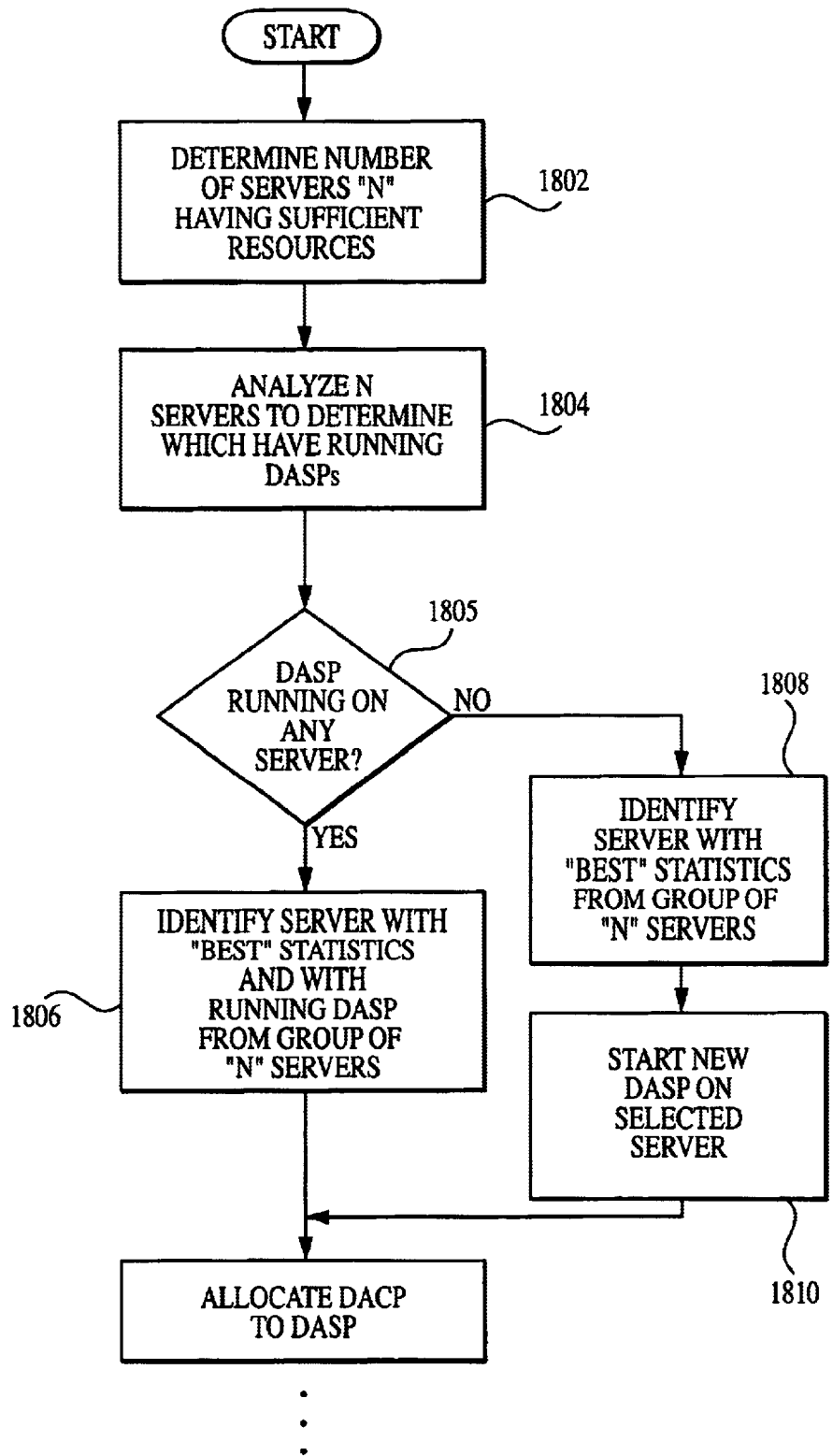
FIG. 18 is a logical flow diagram illustrating one exemplary embodiment of weighting servers within the server farm for DASP allocation.

FIG. 18 illustrates one exemplary embodiment of the method 1800 of weighting servers within the server farm for DASP selection. Initially, "N" servers in the statistics reporting hierarchy are considered (N being an integer), although it will be recognized that the number of servers considered may vary based on a variety of factors. The maximum value of N is the number of servers in the server farm. Initially, all servers are eligible. As the system runs and DASPs are spawned and the available resources in the servers decline, some servers may become ineligible based on minimum resource availability requirements, lowering the value of N (step 1802). In steps 1804 and 1805, the selected servers within the hierarchy are analyzed to determine if any have an available DASP already running. The statistics of each selected server having a running DASP are analyzed per step 1806, and the server with the lowest statistics from this group selected. If none of the selected servers have an available DASP running, a new one will be started in the server with the lowest system-wide performance statistics; e.g. the "lowest statistics server," per steps 1808 and 1810. Table 3 illustrates the application of the foregoing methodology for three selected servers, the integer numbers representing the number of votes matching servers will cast.

TABLE 3

|  | Lowest Stat Server | $2^{nd}$ Lowest Stat Server | $3^{rd}$ Lowest Stat Server |
|---|---|---|---|
| Available DASP running | 10 | 9 | 8 |
| No DASPs Available | 7 | 6 | 5 |

Data needed to implement the foregoing server and DASP selection methodology includes system performance statistics from each server in the distributed application balancing system server farm 708, as well as performance statistics from each DASP running on each server in the server farm. The statistical process 712 on each server farm server maintain the system statistics records in the system database up to date with system performance statistics from all servers in the server farm. In the illustrated embodiment, the well known Simple Network Management Protocol (SNMP) is used to implement these queries, although other techniques and protocols may be used. The statistical process 712 also optionally queries each DASP process periodically (such as at a predetermined frequency or upon the occurrence of a particular event) for performance statistics.

Alternatively, or as a complement to the foregoing periodic queries, the DASP processes may be configured to report their statistics in an unsolicited fashion to the statistical process if desired. This functionality is determined by the distributed application author at distributed application creation time. In either case, the load balancing process 704 is able to determine if any DASPs are available for new DACP service when a DASP request message is received from a TSDACP.

Once the load balancing processes in the server farm group have chosen a server for the DASP, the load balancing process 704 on the selected server either chooses a running DASP or starts a new DASP. If a DASP is already running on the server, the load balancing process identifies or "flags" the running DASP during the server selection process. This approach advantageously avoids more processing by the load balancing process to select a DASP. If no DASP is running, the load balancing process starts a DASP according to the methodology previously described herein.

When the load balancing process starts a DASP, it passes the DASP the TSDACP's "open session" request message protocol. The DASP sends the TSDACP a "open session reply" message containing, among other things, its message protocol (MP) address as soon as it is able. The TSDACP responds with a "acknowledged" message.

Each DASP of the present invention contains runtime environment logic which is included in the design framework, and further contains author-added logic specific to the application it is executing. In one exemplary embodiment, a DASP of the invention is configured as a loop that waits to receive messages from the TSDACP or infrastructure processes. The top of the loop is a shared resource call to an Operating System (OS) mechanism such as a message queue. This is the queue that a client/server partition may be putting received network messages into and allows only one message sender to be processed at a time, in "first-come, first-served" order.

When a DASP begins processing, it registers to receive runtime environment system events. These events include a statistics request, a shutdown request, a state request, an add client request, and the like. Registration is accomplished by sending a message to the local load balancing process. If the DASP is being used in an OpenCable application, the DASP may be configured to register events for an OpenCable compliant application as well. Such events could include program start or triggers. The OpenCable specification will provide an API to make these calls. When the load balancing process starts a DASP thread, it passes the DASP thread its MP address as a parameter. If it is starting the DASP for a specific DACP or TSDACP, the load balancing process passes to the DASP thread the client's MP "open session" request as a start-up parameter. Alternatively, the load balancing process sends the DASP an "add client" message after the DASP has started. The "add client" message contains, inter alia, the client's MP "open session" request.

Figure 19:
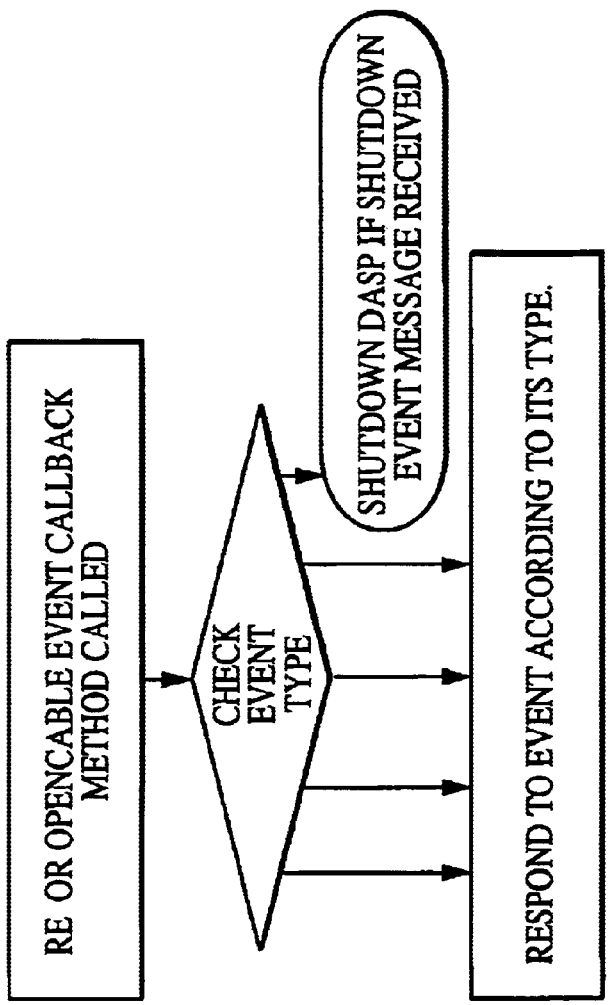
FIG. 19 is a logical flow diagram illustrating one exemplary embodiment of the method of event callback within an asynchronous runtime environment.

Note that in the present embodiment, runtime environment system events are asynchronous. The DASP being started registers for these events by calling a registration method and passes it the callback method or object. When the runtime environment encounters one of the events that the DASP has registered for, it will call the method or object given during registration. The callback method is called when the event occurs. This approach advantageously allows runtime environment processes to communicate with a DASP without "breaking into" the logic the DASP uses to communicate with a DACP. The callback method does not affect the DASP or network partition handling of the incoming message queue. The callback method executes within the context of the DASP thread so that it can instigate the DASP to take the appropriate action. FIG. 19 illustrates the high level logical flow of one embodiment of the event callback method of the invention.

Figure 20:
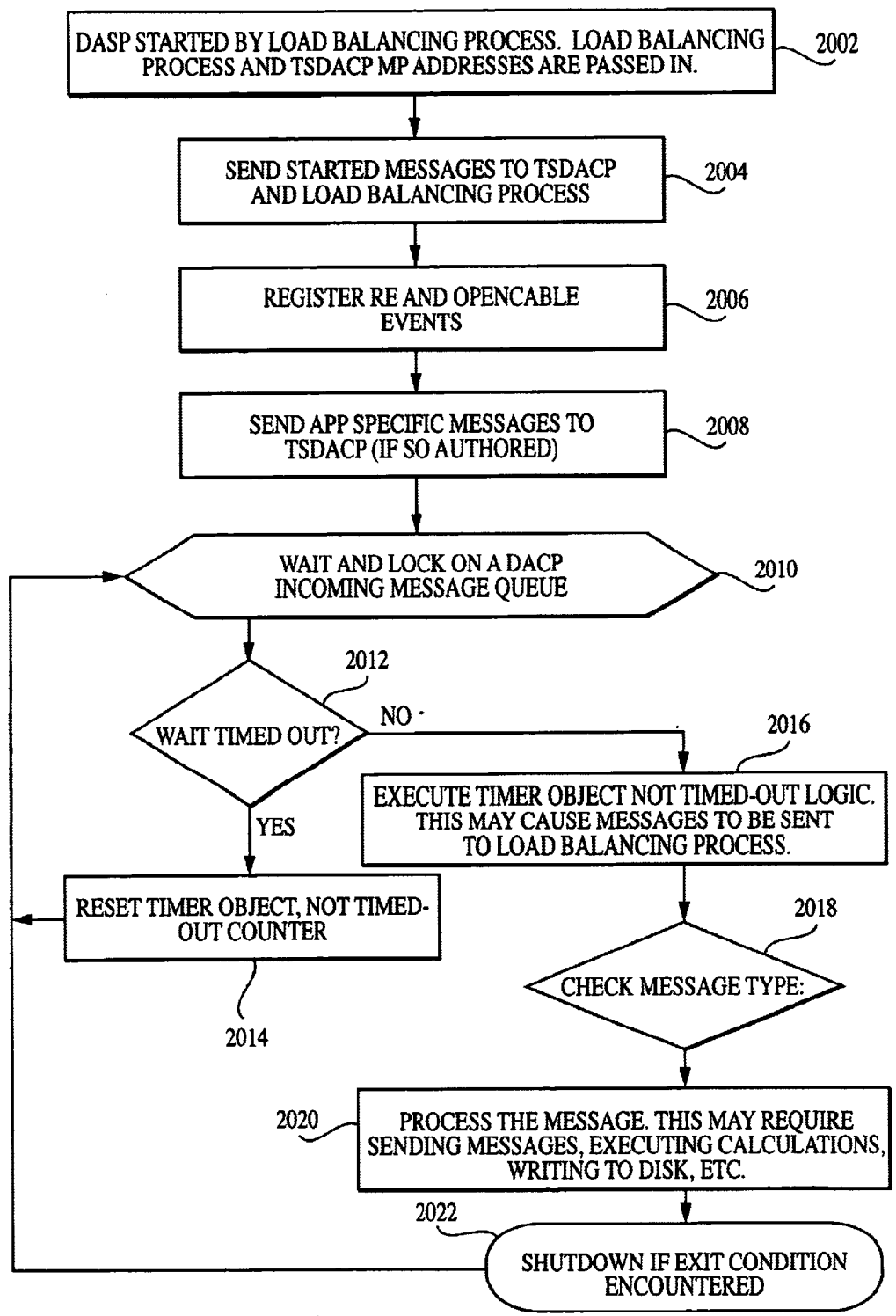
FIG. 20 is a logical flow diagram illustrating one embodiment of the method of operating the distributed application server portion (DASP) within the runtime environment of the invention.

FIG. 20 illustrates one exemplary method of operating a DASP according to the invention. As soon as the DASP starts (step 2002) such as by a load balancing process, it first sends the TSDACP the "open session" reply, and also sends the load balancing processes a "started" message (step 2004). Additionally, the DASP sends the load balancing process a message whenever it encounters an error specific to the runtime environment, such as a communications failure, or upon an exit condition. Hence, each DASP of the present embodiment behaves in a manner consistent with and specified by the runtime environment. The load balancing process 704 saves the state of DASPs in its database 706. The statistical process 712 can query any DASP in the same server for statistics. If any runtime environment process requires statistics from another server, the statistical process on that server is contacted using server farm information established when the system is initialized. The statistical process on each server stores the statistics in its respective database.

Note that the database 706 on each server in the server farm 708 is configured to contain a record for each DASP running on that server. Each DASP is ideally authored to handle all entry, error, and exit conditions, and contact the load balancing process for each of those occurrences using the message protocol (MP).

In step 2006 of FIG. 20, runtime environment and Open-Cable events are registered by the DASP. Application specific messages are also sent to the TSDACP per step 2008 if the distributed application is authored for such messages. Next, in step 2010, the DASP waits and locks on an incoming DACP message queue (see discussion of "wait-and-lock" mechanism provided previously herein). If the wait period times out (step 2012), the timer object and the "not timed out" counter are reset per step 2014. If the wait period has not timed out, the timer object's "not timed out" logic is executed per step 2016. This may cause messages to be sent to the load balancing process.

Next, the message type is determined per step 2018. Message types tell the receiver how to behave when it receives the message. Basic system message types include; open-session, close-session, shutdown, get-statistics, as well as others. This set of basic system message types is variable based on system configuration, and may be added to/subtracted from as required. The remainder of the message types are application specific and defined by the author.

The message is next processed in step 2020. Depending on the type of message, this step may require sending other messages, performing calculations, storing data to a storage device, etc. Note that if an exit condition is encountered (step 2022), the DASP is shutdown. If no exit condition is encountered, the DASP returns to the wait and lock state (step 2010).

Similar to the DASPs, DACPs used in conjunction with the present invention are also configured to inform the distributed application balancing system of state changes occurring therein. Each DACP informs its corresponding DASP when the former incurs a start, error, or exit condition. In addition, the DACPs are configured to receive stop, status, and exit requests from their corresponding DASP or a load balancing process.

Shutdown or exit requests must also be accounted for in the invention. A shutdown request to a DASP can come in two forms, namely a "clean" shutdown and an "emergency" shutdown. In a clean shutdown, the DASP sends shutdown messages to all of the DACPs that it is servicing and subsequently waits for acknowledge messages as previously described. In a clean shutdown, the DASP will terminate all processes and communications it is performing on the server and in the server farm in a "friendly" manner, meaning that it attempts to complete processing of and conclude any pending transactions prior to effectuating the shutdown. In an emergency shutdown, the DASP sends the DACP shutdown messages and then exits immediately. Unlike the "friendly" clean shutdown, any pending transactions are immediately abandoned.

Figure 21:
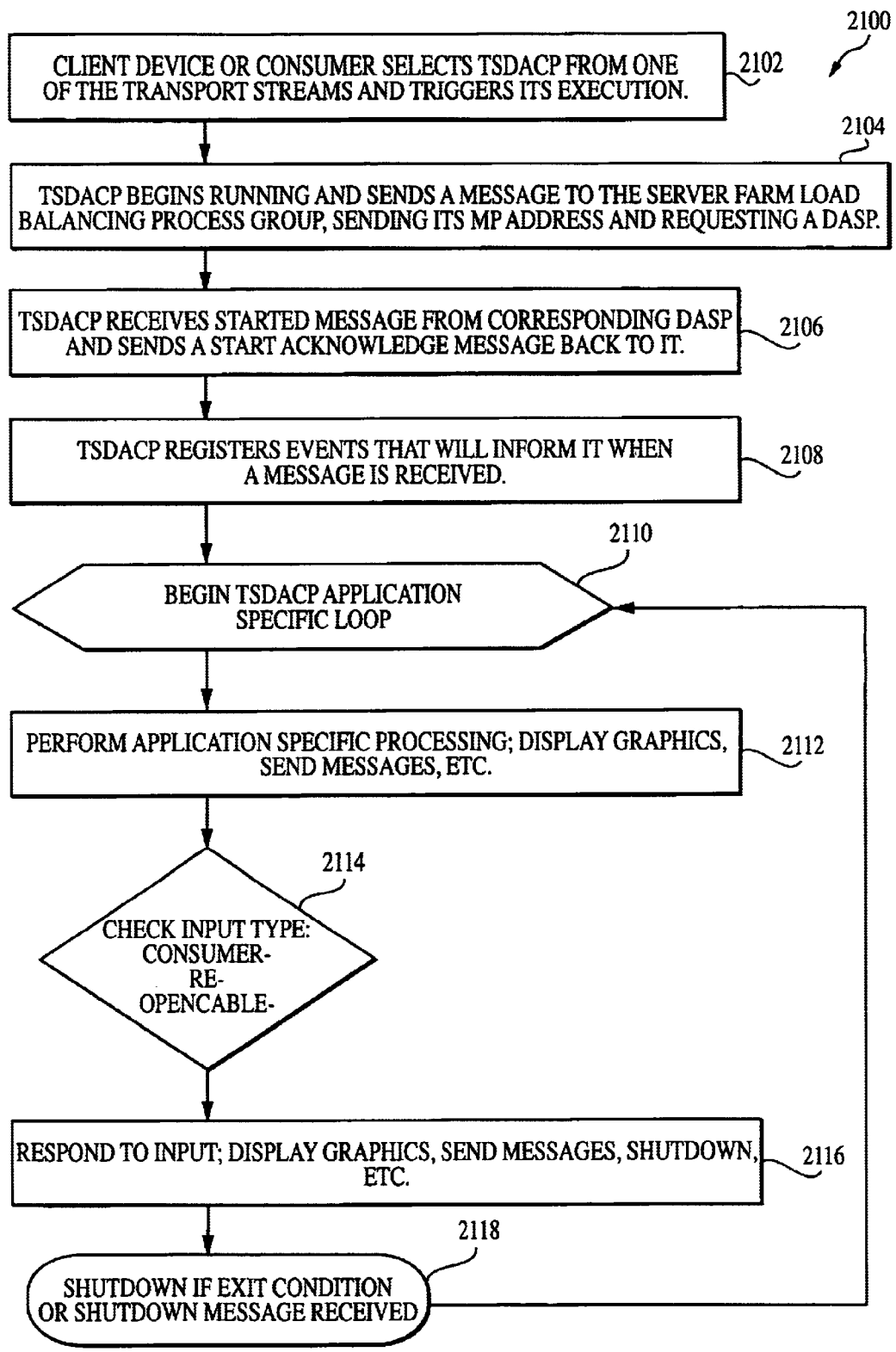
FIG. 21 is a logical flow diagram illustrating one embodiment of the method of spawning a distributed application with the runtime environment of the invention.

Referring now to FIG. 21, one exemplary method 2100 of spawning a distributed application is described. The present embodiment of the invention spawns each distributed application by first starting the TSDACP. Spawning a distributed application by first starting the TSDACP eliminates the need for the DASP to test or experiment with various communications assets in order to establish a communications link with a DACP. Specifically, in step 2102, the client device or consumer selects the TSDACP from one of the transport streams and triggers the execution thereof. Next, in step 2104, the TSDACP begins running and sends an "open session" message to the server farm load balancing process group. This message includes the TSDACP's message protocol address and also includes a request for a DASP.

Note that when the TSDACP initializes, it may use a query (such as an OpenCable compliant API) to determine the configuration of the host client device. This approach advantageously allows the TSDACP to determine which physical interfaces are available to communicate back upstream to the head-end and the corresponding DASP. This implies that the TSDACP is downloaded (or subsequently configured) with one or more add-on modules capable of communicating in the MSO network using one or more of the available reverse channels. For example, if the MSO network provides OOB Reverse Data Channel (OOB-RDC), DOCSIS, and the telephone company (telco), the TSDACP can be downloaded with add-on modules to handle any one or all of those interfaces. The MSO further has the advantage of being able to selectively download only those modules that the customer has signed up and paid for. For example, if the customer has not subscribed for cable modem service, the DOCSIS module would not be downloaded as part of the DACP to that customer's client device. Furthermore, once the TSDACP is started and has queried the host client's configuration, it can selectively drop any add-on modules that the client does not support.

Referring again to FIG. 21, the TSDACP receives a "open session" message from the corresponding DASP per step 2106, and sending a "open session" acknowledge message back to the DASP. Subsequently, in step 2108, the TSDACP registers events that will inform it when a message is received.

At this point, the TSDACP application specific loop is commenced (step 2110), and the application specific processing (e.g., display of graphics, message transmission, etc.) is performed per step 2112. The type of input (e.g., consumer, RE, or OpenCable) is checked per step 2114, and the input is responded to by the application per step 2116. Lastly, the application is shutdown per step 2118 if an exit condition exists, or a shutdown message received as previously described.

As previously described, the message protocol (MP) of the invention contains multiple ways of communicating between runtime environment entities based on each entity's proximity to the entity or entities with which it is communicating, and the nature of their relationship. Runtime environment relationships present within the invention generally fall into one of several categories including DASP/DASP, DACP/DASP, and DACP/DACP. These relationships may each have different types of communication modes and messages. To enable distributed application load balancing, a subset of these communication modes and message types is defined. Table 4 lists the exemplary messaging architecture used to implement load balancing of DASPs according to the invention.

TABLE 4

| Sender | Receiver | Message Type | Local | Communications Mode |
|---|---|---|---|---|
| TSDACP | Load balancing Group | DASP "open session" request The IP multicast address of the load balancing group must be contained within the TSDACP when it is downloaded. This could be precluded by the use of a broadcast, but the broadcast adds processing time. | No | IP Multicast |

TABLE 4-continued

| Sender | Receiver | Message Type | Local | Communications Mode |
|---|---|---|---|---|
| Load balancing process | DASP | "open session" request | Yes | Named pipe |
| Load balancing Group | Load balancing Group | <<All server selection messages>>: One to many multicast messages sent between the servers in a server farm. | No | IP Multicast |
| Load balancing process | DASP | Statistics request: DASP responds with performance statistics. | Yes | Runtime environment event |
| Statistical process | Statistical Group | Server statistics requests: All servers respond with system performance statistics. | No | IP Multicast |
| Load balancing process | DASP | <<All shutdown messages>>: Includes normal and emergency shutdowns. | Yes | Runtime environment event |
| DASP | Load balancing process | State change: DASP informs load balancing of all state changes. | Yes | Runtime environment trap |

Note that the term "local" as used in Table 4 refers to two runtime environment entities which are located in the same server. If not local, the two entities are physically separated but connected via a network connection. Additionally, the "communications mode" of the illustrated embodiment comprises one of three types: (i) IP Multicast, wherein the receiving group of servers has a common multicast address; whenever a client sends a message to that address, all of the servers in the group will receive it; (ii) runtime environment event, wherein the receiver is informed of the message receipt by event registration using a callback or similar function; or (iii) runtime environment trap, wherein the sending client uses a trap message, as per the SNMP, to send an unsolicited message to the server, and the sending client must know the receiver's message protocol address.

Figure 22:
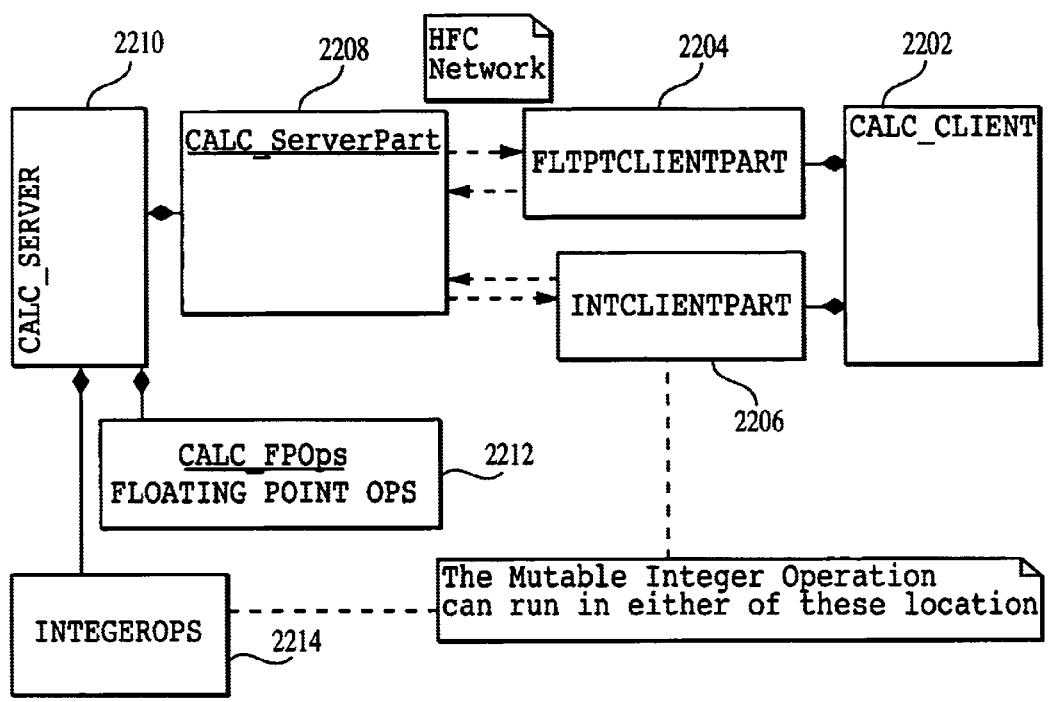
FIG. 22 is an object block diagram illustrating the relationship between various objects within an exemplary floating point calculator distributed application used in conjunction with the invention.
Figure 23:
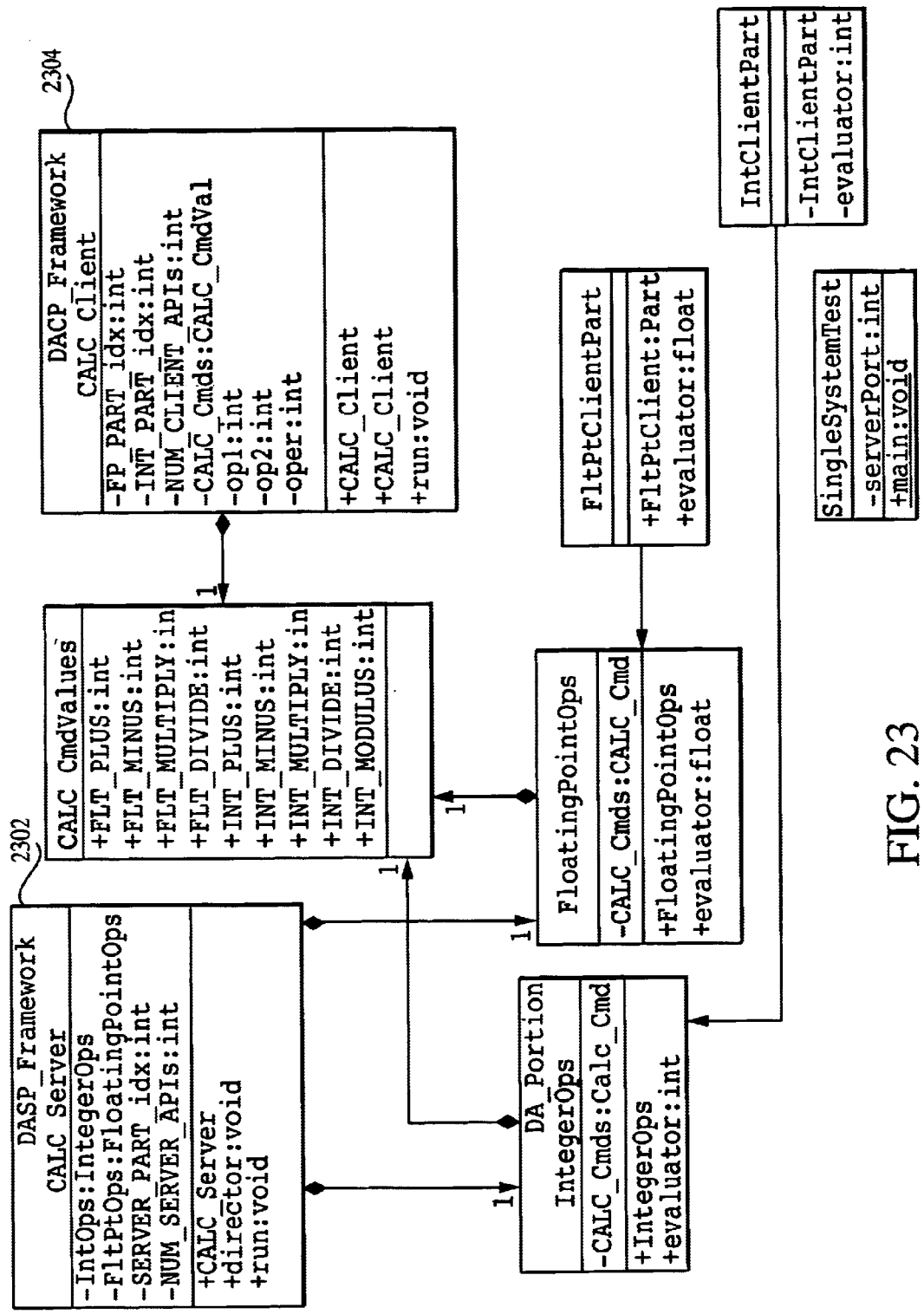
FIG. 23 is a block diagram illustrating one exemplary embodiment of an analysis phase unified modeling language (UML) class diagram for the floating point calculator distributed application of FIG. 22.

Referring now to FIGS. 22 and 23, one exemplary distributed application (e.g., a floating point calculator) used in conjunction with the present invention is described in order to illustrate the general concepts of the invention. FIG. 22 is an object diagram for the floating point calculator distributed application. FIG. 23 is a UML class diagram, similar to that previously described with respect to FIG. 5 herein, for the same calculator application. It is noted that some of the minor objects, such as classes containing only constants, are omitted from FIG. 22 and the following discussion for the sake of simplicity.

Consider a client device that cannot run floating point operations due to restrictions in its equipment configuration. Floating point operations are therefore distributed to a server associated with the client device. In the example of FIG. 22, the integer operations are "mutable" and therefore can run on a DASP or DACP without changes to the application or runtime location tests. The location of the integer operations are characteristically determined by the processing power and configuration of the client device, although other criteria may be applied.

These UML objects present in the object diagram for the calculator (FIG. 22) are described in the following paragraphs.

(i) CALC_Client 2202 displays the calculator GUI. It accepts input from the user. It also determines if the operation to be performed is floating point or integer and calls the appropriate method in the corresponding partition.

(ii) FltPtClientPart 2204 is a floating point partition which packages floating point operation requests from the DACP and sends them to the server. It then waits for the response from the server, and returns the received response to the DACP.

(iii) IntClientPart 2206 is an integer partition which behaves similarly to the floating point partition described above, except that it handles integer based operations.

(iv) CALC_ServerPart 2208 is a partition used for application specific message management for the DASP. It waits for commands from clients, and can handle multiple clients simultaneously. It also checks messages for corruption and validity and ACKs or NAKs each message accordingly. This partition also puts the messages in a queue that the DASP will read.

(v) CALC_Server 2210 is an object which loops and reads messages from the server partition queue. It also determines if the message is for integer or floating point operations and calls the appropriate object method. It also calls the server partition send method to return the answer to the client device.

(vi) FloatingPointOps 2212 is an object which contains methods for floating point computations including add, subtract, multiply, and divide operations.

(vii) IntegerOps 2214 is an object which contains methods for integer computations including add, subtract, multiply, divide, and modulus. IntegerOps is derived from DA_Partition so that it can be assigned as a DACP client/server partition.

Referring to FIG. 23, a number of relationships between the various objects 2202–2214 of the system are defined. First, those objects whose descriptions end with the designation "DASP" inherit from the DASP_Framework 2302, and those objects whose descriptions end with the designation "DACP" inherit from the DACP_Framework 2304. This creates the distributed application server and client portion anchor points. The concept of inheritance is well known in object-oriented programming, and accordingly is not described further herein. Second, those objects whose descriptions end with the designation "Part" (e.g., CALC_ServerPart 2208 in FIG. 22) inherit from DA_NetPart (not shown). IntegerOps 2214 (FIG. 22) inherits from DA_Partition (not shown), which allows it to be assigned in the same location as a partition. Third, the IntClientPart 2206 and IntegerOps 2214 must have integer operations with the same signature. Whether the integer operations are local or remote, the DACP can call them in the same fashion.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of distributing a distributed application on a network, comprising:

disposing said distributed application on at least one server within said network, said distributed application comprising a plurality of modules;

transferring a first portion of said plurality of modules to a client device via a first communication channel;

attempting to establish a second communication channel between said client device and said server; and transferring a second portion of said distributed application to said client device from said server when said second communication channel can not be established.

2. The method of claim 1, further comprising:

attempting to establish said second communication channel after said second portion of said distributed application has been transferred; and transferring a third portion of said distributed application to said client device when said second communication channel can not be established after said second portion has been transferred.

3. The method of claim 1, wherein said network comprises a cable network, and the act of transferring said first portion comprises downloading a client portion to a client device.

* * * * *